United States Patent
Bojoi et al.

(10) Patent No.: US 10,819,264 B1
(45) Date of Patent: Oct. 27, 2020

(54) ROBUST STARTING SYSTEM AND METHOD FOR INTERIOR PERMANENT MAGNET SYNCHRONOUS MOTOR CONTROL

(71) Applicant: Wolong Electric Group Co. Ltd., Zhejiang (CN)

(72) Inventors: Radu Bojoi, Turin (IT); Zheng Zhang, Saint Joseph, MI (US); Ze Jiang, Zejiang (CN)

(73) Assignee: Wolong Electric Group Co. Ltd., Zejiang (CN)

( * ) Notice: Subject to any disclaimer, the term of this patent is extended or adjusted under 35 U.S.C. 154(b) by 0 days.

(21) Appl. No.: 16/984,267

(22) Filed: Aug. 4, 2020

(51) Int. Cl.
*H02P 21/12* (2016.01)
*H02P 21/18* (2016.01)
*H02P 21/13* (2006.01)
*H02P 21/34* (2016.01)
*H02P 21/22* (2016.01)

(52) U.S. Cl.
CPC .............. *H02P 21/12* (2013.01); *H02P 21/13* (2013.01); *H02P 21/18* (2016.02); *H02P 21/22* (2016.02); *H02P 21/34* (2016.02); *H02P 2203/05* (2013.01); *H02P 2203/11* (2013.01)

(58) Field of Classification Search
CPC ....... H02P 21/12; H02P 21/18; H02P 2203/05
See application file for complete search history.

(56) References Cited

U.S. PATENT DOCUMENTS

| | | | |
|---|---|---|---|
| 7,334,854 B1 | 2/2008 | Chang et al. | |
| 7,999,496 B2 | 8/2011 | Gleason et al. | |
| 8,796,974 B2 | 8/2014 | Wang et al. | |
| 9,916,617 B2 | 3/2018 | Feuersaenger et al. | |
| 9,931,618 B2 | 4/2018 | Cotter et al. | |
| 2004/0070362 A1* | 4/2004 | Patel | H02P 21/00 318/701 |

OTHER PUBLICATIONS

Guglielmi, P., et al., "Cross-Saturation Effects in IPM Motors and Related Impact on Sensorless Control", IEEE Tran. Ind. Applicat., vol. 42, No. 6, pp. 1516-1522, Nov./Dec. 2006.
(Continued)

*Primary Examiner* — Cortez M Cook
(74) *Attorney, Agent, or Firm* — Warner Norcross + Judd LLP

(57) ABSTRACT

A robust starting system and method for an interior permanent magnet synchronous motor, suitable for commercial fan and blower drive applications. A comprehensive starting control process is provided that utilizes control flags to implement closed-loop control accounting for any pre-existing rotor movement, controlling the motor speed from an initial speed to a destination speed. A universal dqController provides selective configurability for collecting information regarding the initial state of the motor, as well as starting and operational motor control. Dynamic high frequency injection enables the use of HFI outside the normal standstill motor speeds by intelligently decoupling the high frequency and rotor movement portions of the stator current response.

30 Claims, 16 Drawing Sheets

(56) References Cited

OTHER PUBLICATIONS

Bojoi, R., et al., "Sensorless Control of PM Motor Drives—a Technology Status Review", Proc. of the 2013 IEEE Workshop on Electrical Machines Design, Control and Diagnosis, (WEMDCD), Paris, 2013, pp. 166-180.

Bianchi, N., et al., "Comparison of PM Motor Structures and Sensorless Control Techniques for Zero-Speed Rotor Position Detection", IEEE Tran. Power Electron., vol. 22, No. 6, pp. 2466-2475, Nov. 2007.

Holtz, J., "Acquisition of Position Error and Magnet Polarity for Sensorless Control of PM Synchronous Machines", IEEE Trans. on Industry Applications, vol. 44, No. 4, Jul./Aug. 2008.

Fatu, M., et al., "I-F Starting Method with Smooth Transition to EMF Based Motion-Sensorless Vector Control of PM Synchronous Motor/Generator", IEEE Power Electronics Specialists Conference (PESC), 2008, pp. 1481-1487.

Agarliță, S.-C., et al., "I-f Starting and Active Flux Based Sensorless Vector Control of Reluctance Synchronous Motors, with Experiments", 12th International Conference on Optimization of Electrical and Electronic Equipment (OPTIM), 2010, pp. 337-342.

Brandstetter, P., et al., "Sensorless Control of Permanent Magnet Synchronous Motor Using Voltage Signal Injection", Elektronika IR Elektrotechnika, ISSN 1392-1215, vol. 19, No. 6, 2013, pp. 19-24.

Kang, J., "Sensorless Control of Permanent Magnet Motors", Control Engineering, vol. 57, No. 4, Apr. 2010, pp. 1-4.

Unpublished U.S. Appl. No. 16/795,074, filed Feb. 19, 2020, entitled "System and Method for Interior Permanent Magnet Synchronous Motor Control from Zero or Low Speed".

\* cited by examiner dCONTROLLER STATUS:

MOVEMENT DETECTION ON: CURRENT CONTROL, $\vartheta^*, i_d^*, i_q^* = 0$
MOVEMENT DETECTION OFF: FLUX CONTROL

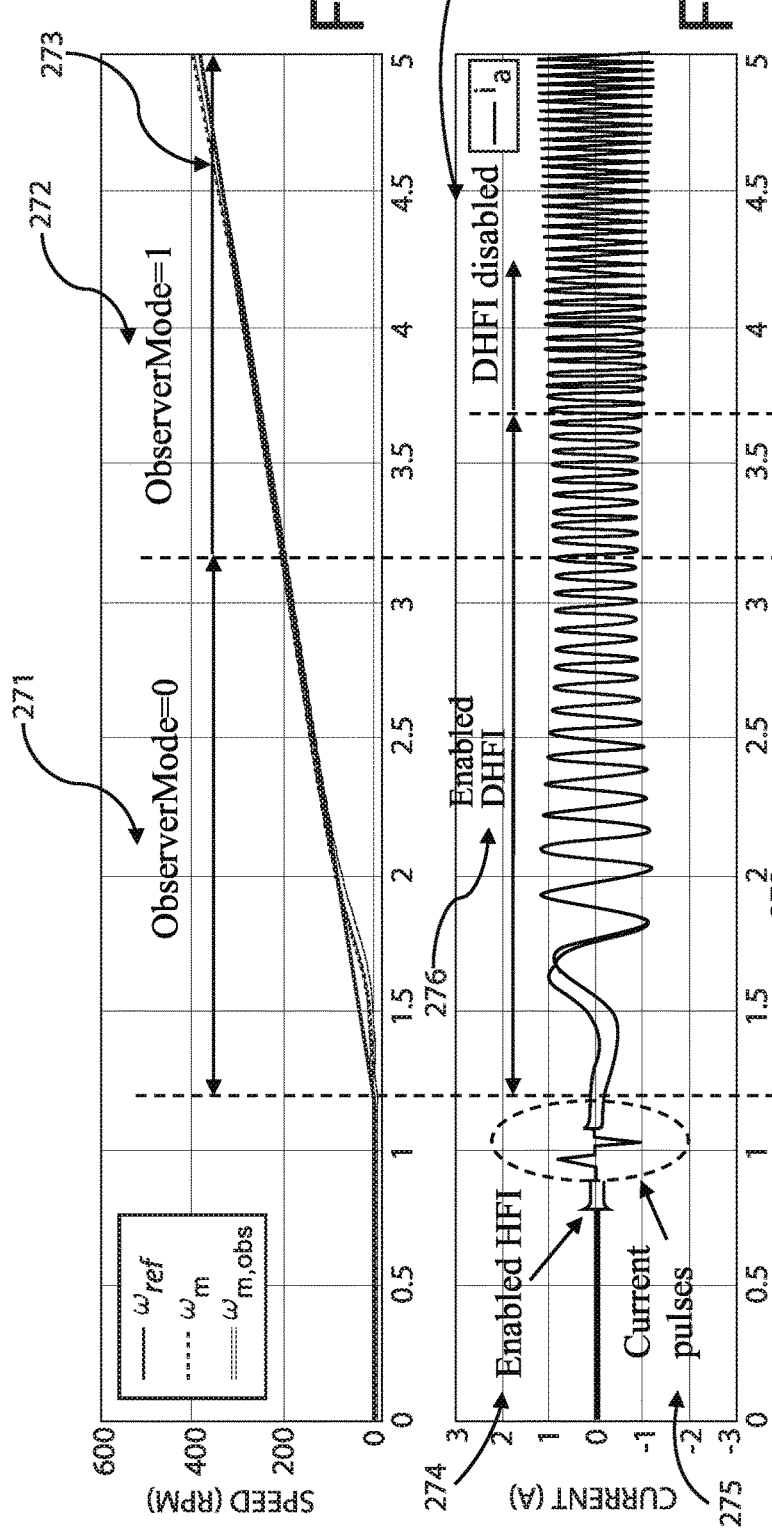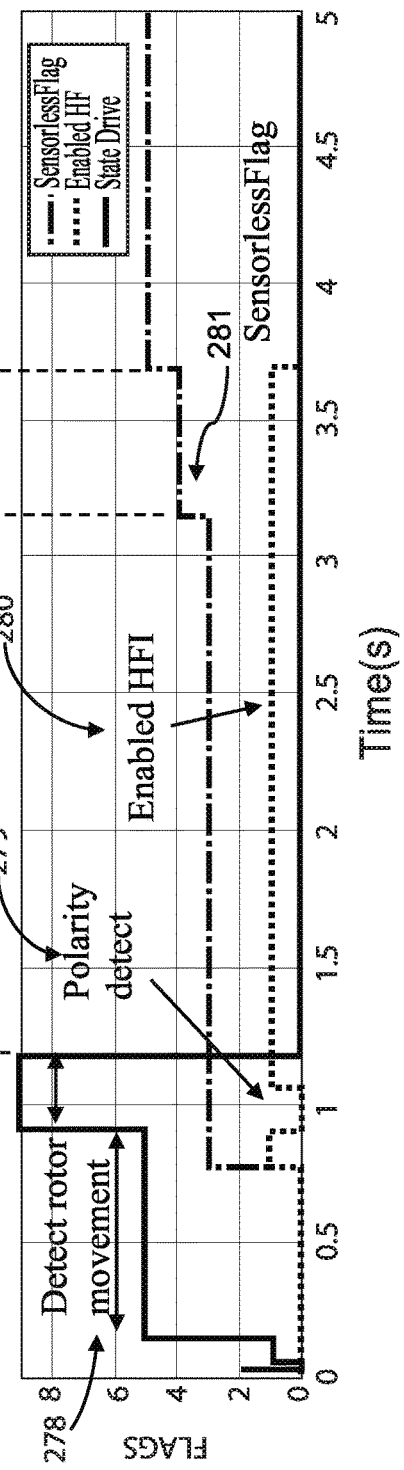

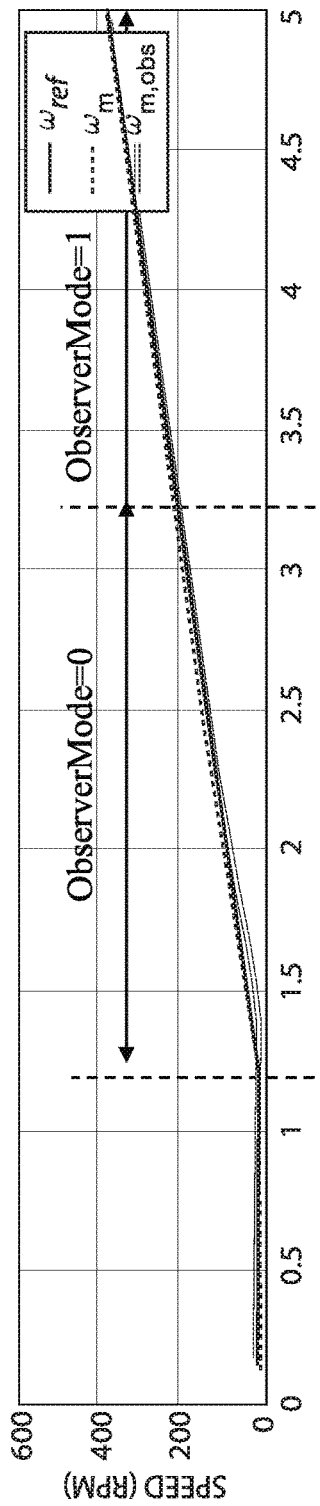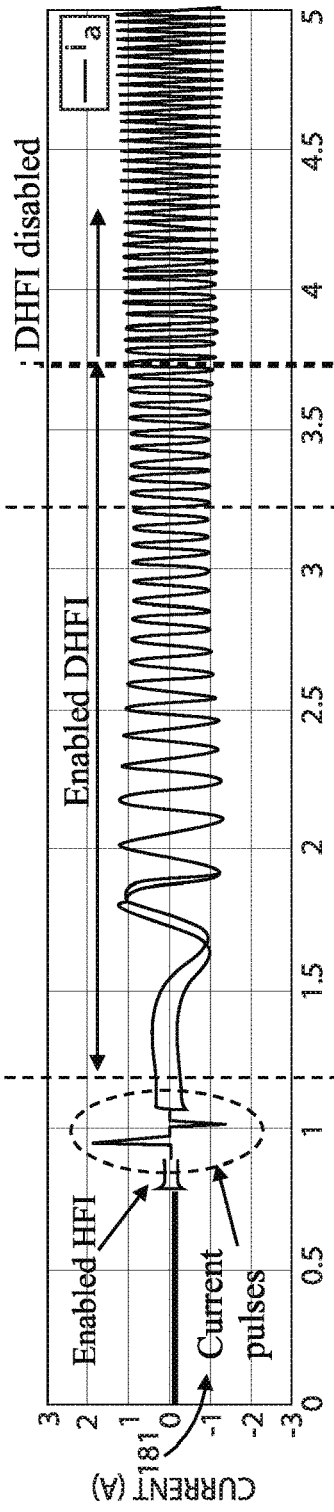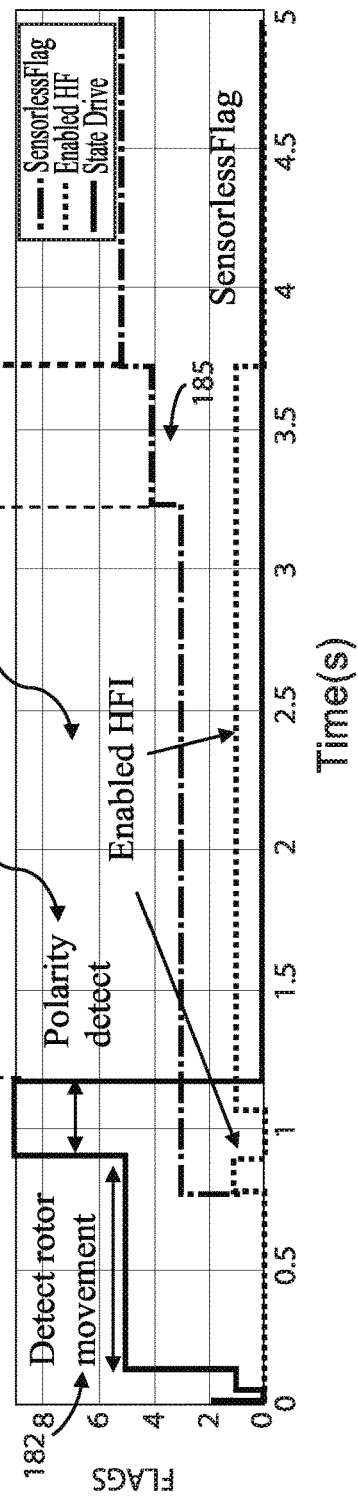

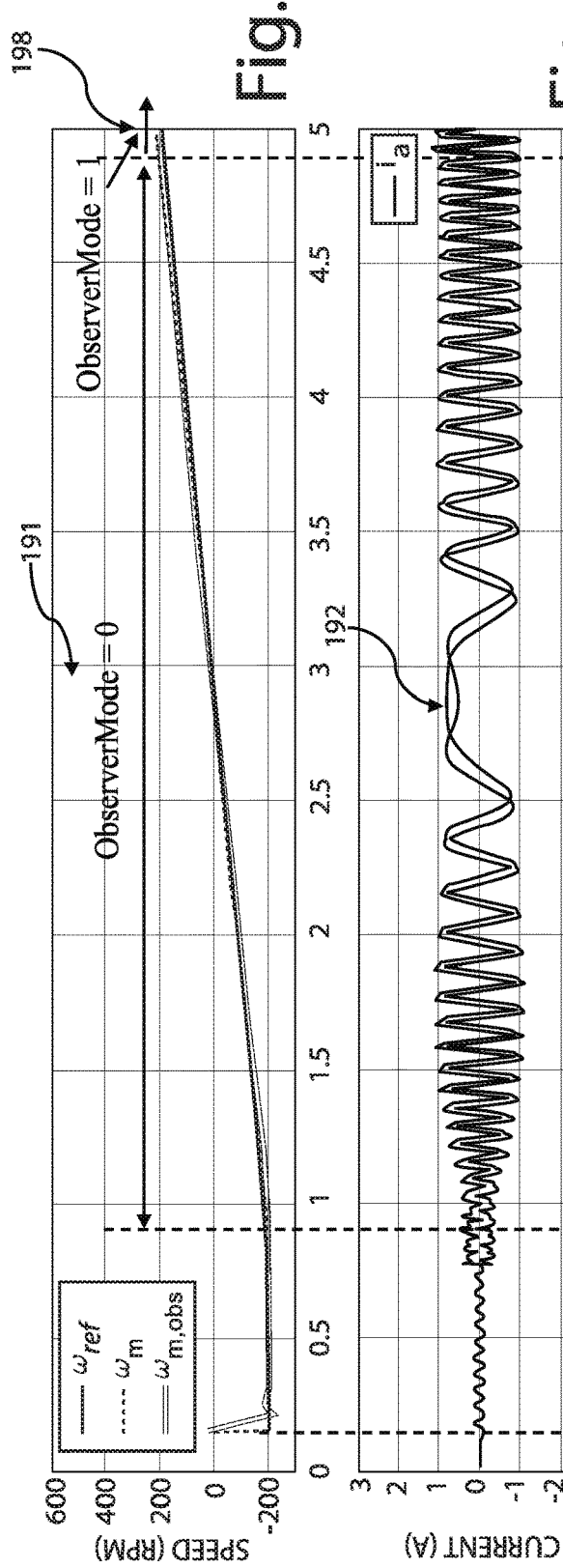
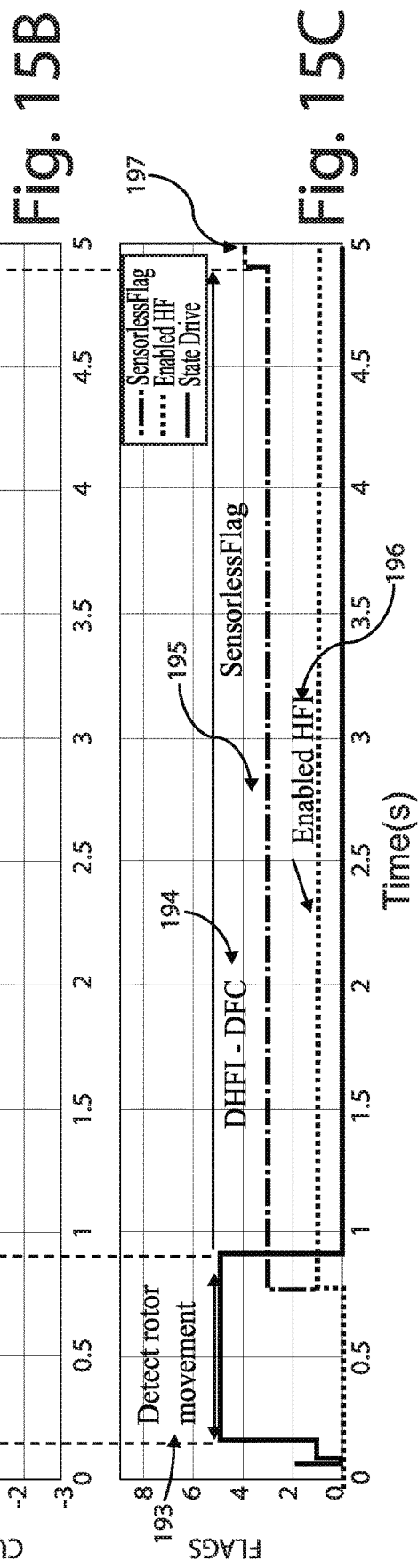
Fig. 15A
Fig. 15B
Fig. 15C

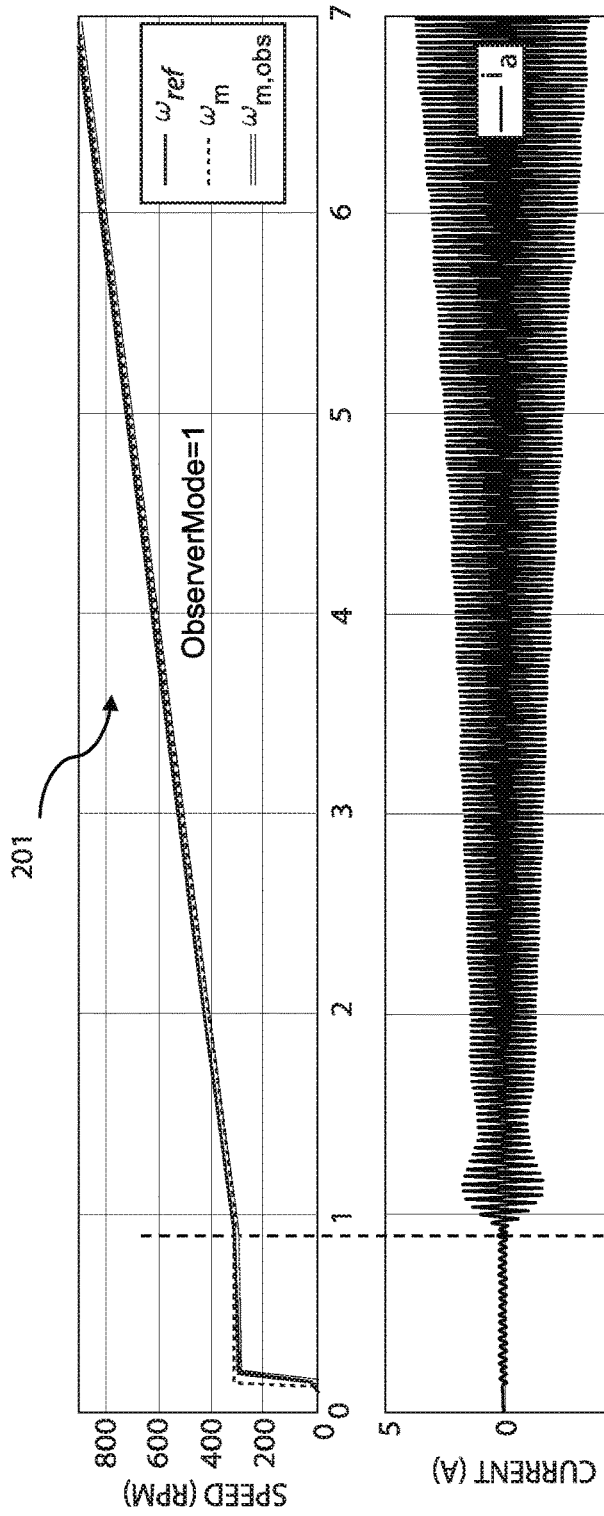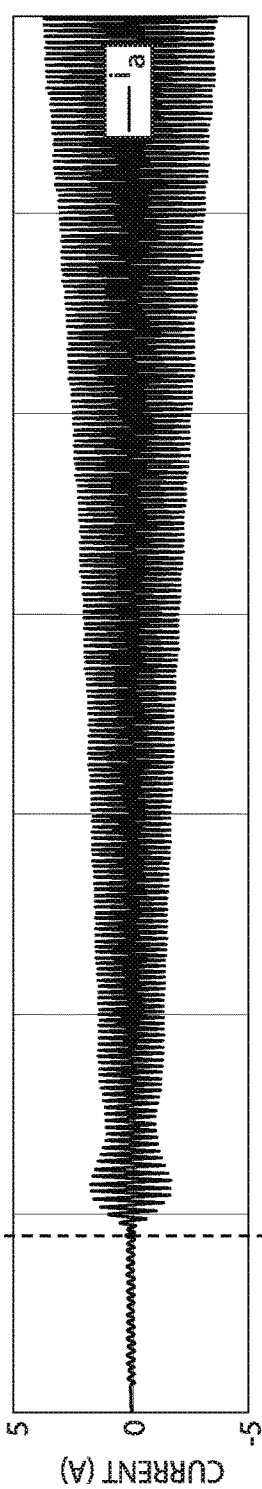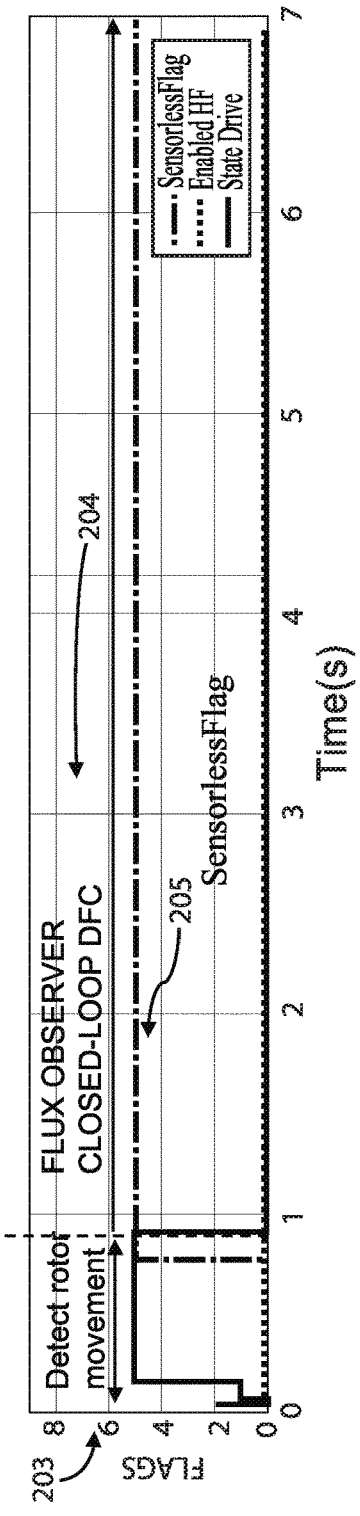

ROBUST STARTING SYSTEM AND METHOD FOR INTERIOR PERMANENT MAGNET SYNCHRONOUS MOTOR CONTROL

BACKGROUND OF THE INVENTION

The present invention relates to control of interior permanent magnet motor systems, for example as utilized in connection with commercial blower and fan driving applications. Certain embodiments relate to a robust starting control method that is effective to start a permanent magnet synchronous motor system regardless of operational conditions in the field, using closed loop control from starting moment through startup to normal operation.

As a new generation of electronic motor control technologies have been developed over the past decade, sensorless based Permanent Magnet Synchronous Motor (PMSM) systems have begun being utilized in commercial fan and blower driven applications. These sensorless motors can deliver not only high peak efficiency at the rated working speed, but also a large high-efficiency operational speed range. Furthermore, variable speed operation allows the system to operate under a low capacity during the off-peak period, such as nighttime, which allows HVAC systems that utilize PMSM systems to achieve high energy savings. In addition, these electronically controlled PMSM systems also provide broad sensing and monitoring opportunities for product system AI controls and remote control through a variety of communication technologies, such as cloud calculation, to improve operational energy saving, safety, and reliability.

One drawback of sensor based PMSM systems is their speed and/or position sensor. That is, sensor-based PMSM systems use a speed and/or position sensor external to the motor (e.g., mounted to the motor shaft), which takes up space, adds cost in the form of additional electronics, and is an additional fault point that detracts from the reliability of the motor. Instead of incorporating external sensors, sensorless PMSM systems rely on sensing operating characteristics of the motor itself for control. Sensorless PMSM control generally involves utilizing estimated values, such as estimated position angle and estimated motor speed, to replace control values directly measured with external sensors in sensor based PMSM systems.

Unlike a traditional three-phase AC induction motor, permanent magnet synchronous motor (PMSM) driven systems typically utilize a special starting method. Starting the permanent magnet motor rotor is a challenge for sensorless PMSM systems because when the motor is in a standstill condition (e.g., at zero speed or low speed) typical sensorless methods for estimating rotor position and speed are unreliable, such as flux-based speed estimations that are commonly used at normal operating speeds where they are particularly robust and reliable.

Known sensorless PMSM startup control methods can generally be classified into two main types, those that rely on back electromotive force (back-EMF) and those that rely on signal injection. Back-EMF startup methods estimate the back-EMF generated by rotation of the motor under fundamental excitation for position and speed estimation. Signal injection methods typically utilize high frequency signal injection or other excitation separate from the fundamental excitation to track the spatial saliency image of the rotor to extract position information. Both of these types of techniques commonly derive rotor speed information from measured stator voltages/currents in combination with open-loop estimators or closed-loop observers based on a mathematical model of the motor.

While back-EMF voltage is generally proportional to the motor speed, meaningful voltage information for back-EMF starting methods can be difficult to detect when the motor is at zero or low speeds because the back-EMF may be indistinguishable from noise at those levels. Starting motor control from an unknown rotor position and speed may cause a starting failure or temporary reverse motor rotation. Accordingly, conventional sensorless motors typically only handle simple situations at startup. For example, one simplistic solution involves stopping or parking the motor in a known position, operating the motor in an open loop control mode to ramp up until an observer is able to read the back-EMF feedback to detect the rotor position and switch the motor to closed loop control mode. Techniques have been developed to improve this "catch up" style starting methodology over the years. While these techniques can be effective in small power permanent magnet motors, they are not well suited for commercial fans and blowers. For commercial fans and blowers, the wing size may be large, resulting in a large inertia, which usually leads to rotor oscillations or difficulty in reaching a zero-speed condition. Sometimes the natural wind-run force to the wings is too large to hold the rotor by braking, which causes these opened-loop starting methods to fail in commercial fan drive applications.

While the next generation of commercial HVAC products utilize advanced PMSM systems to drive the fans or blowers, those systems lack the ability to provide desired motor speed control at low speed ranges during startup, for example providing a stable 30-50 Rpm for more than 10 seconds, and there are significant challenges to providing this type of control in known PMSM systems.

Some startup motor control systems use a high frequency injection ("HFI") method that relies on magnetic saliency present in interior PMSM systems. However, these methods involve a complex analysis of the motor response to the HFI that requires that the motor be at zero or very low speeds, often achieved by open loop control, such as by use of a braking system, which suffers from the same issues described above. At speeds above standstill levels (i.e., zero to a few RPMs), the HFI can cascade through the motor control and negatively affect the response and integrity of the control system output signals.

A more robust and advanced method for sensorless motor control, including closed loop control from startup to operation regardless of operational characteristics of the motor, is desirable.

SUMMARY OF THE INVENTION

The present disclosure describes various embodiments for providing robust startup motor control for a permanent magnet synchronous motor ("PMSM"). Many of the embodiments described herein are suitable for commercial fan and blower drive applications where robust motor startup control can be lacking. As will be discussed in more detail in connection with a number of different embodiments throughout the disclosure, the motor control systems and methods of the present disclosure can include circuitry to implement sensorless permanent magnet motor control, including one or a combination of the following features:

complete closed-loop startup control of a motor from varied starting motor conditions;

a programmed rotor movement detection operation for detecting rotor movement during the starting moment of the motor;

selective configuration of motor controller components to provide a universal dqController for carrying out a detect rotor movement operation, controlling the motor during startup, and controlling the motor during normal operation; and dynamic high frequency injection ("DHFI") including systems and methods to decouple a high frequency injection ("HFI") signal and rotor movement signals from the stator current response; and a comprehensive programmed motor starting sequence operated by application of various flags that govern different control modes. The status of the flags and control modes change based on stator feedback and other information derived from the stator feedback, including, for example, the estimated speed of the rotor, which may be measured differently depending on several factors. Ultimately, the ability to transition between motor control methodologies during startup where the motor speed may be variable within a wide range provides a secure, robust process for closed loop starting motor control.

One advantage of some embodiments of the robust starting control systems and methods of the present disclosure is the ability to start an IPMSM regardless of the starting moment motor operational conditions in the field, including the ability to reliably start the motor despite the rotor already moving at the starting moment (e.g., due to wind-run). Motor movement information obtained during the starting moment can provide a stable foundation for providing and maintaining effective, robust, and suitable closed loop motor control throughout the entirety of the motor startup control startup process all the way through normal operation of the motor. This startup motor control can be provided without stopping, slowing, or otherwise controlling the rotor through open loop control commands, which are prone to create issues in commercial fan and blower applications.

Another aspect of the present disclosure relates to a selectively reconfigurable implementation of the motor control system. Components associated with the direct flux control can be selectively configured as a universal dqController that can be selectively configured to detect rotor movement during the starting moment and selectively configured to control the motor during motor startup and during normal operation.

Another aspect of the present disclosure relates to selection of speed estimation methods during motor startup. An initial speed estimation method can be selected based on the rotor movement detected during the starting moment. In addition, the active speed estimation method can be dynamically changed during startup. In some embodiments, a suitable speed estimation method can be selected in real-time during startup based on changes in motor speed. In some situations, multiple speed estimation methods can be maintained simultaneously during certain speed ranges to ensure quick and efficient availability of a reliable speed estimate, which can be helpful where there is a settle time associated with a particular method before it can provide a reliable speed estimate.

One speed estimation method of the present disclosure is a dynamic high frequency injection ("DHFI") speed estimation method that can be utilized even while the rotor is rotating at non-negligible speeds. Just as in normal HFI methods, a high frequency signal is injected into the three-phase stator winding configuration along with the excitation signals generated by the motor control driving commands. However, the response to the high frequency injection is decoupled from the stator current response signal to avoid undue influence from the excitation signals associated with the rotor movement. Further, the response to the excitations associated with the rotor movement can also be decoupled from the stator current response to avoid undue influence from the high frequency injection. Suitable filters can be used to effectively decouple the signals. DHFI allows HFI to provide reliable speed estimates not only at standstill speeds (e.g., zero or a few RPM), but also, due to the decoupling, at low speeds (e.g., about 5-200 RPM, in either direction) where other speed estimation methods can be unreliable.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 13A-C illustrates three graphs of a closed-loop motor control startup process at 0 Rpm speed, 120 degree rotor position angle showing (a) reference or target, actual, and observer estimated speed, (b) one phase current, and (c) flag states;

FIG. 14A-C illustrates three graphs of a closed-loop motor control startup process at −5 Rpm initial speed showing (a) reference or target, actual, and observer estimated speed, (b) one phase current, and (c) flag states;

FIG. 15A-C illustrates three graphs of a closed-loop control starting process at −200 Rpm initial speed showing (a) reference or target, actual, and observer estimated speed, (b) one phase current, and (c) flag states;

FIG. 16A-C illustrates three graphs of a closed-loop control starting process at 300 Rpm initial speed showing (a) reference or target, actual, and observer estimated speed, (b) one phase current, and (c) flag states.

DESCRIPTION OF THE CURRENT EMBODIMENTS

Figure 1B:
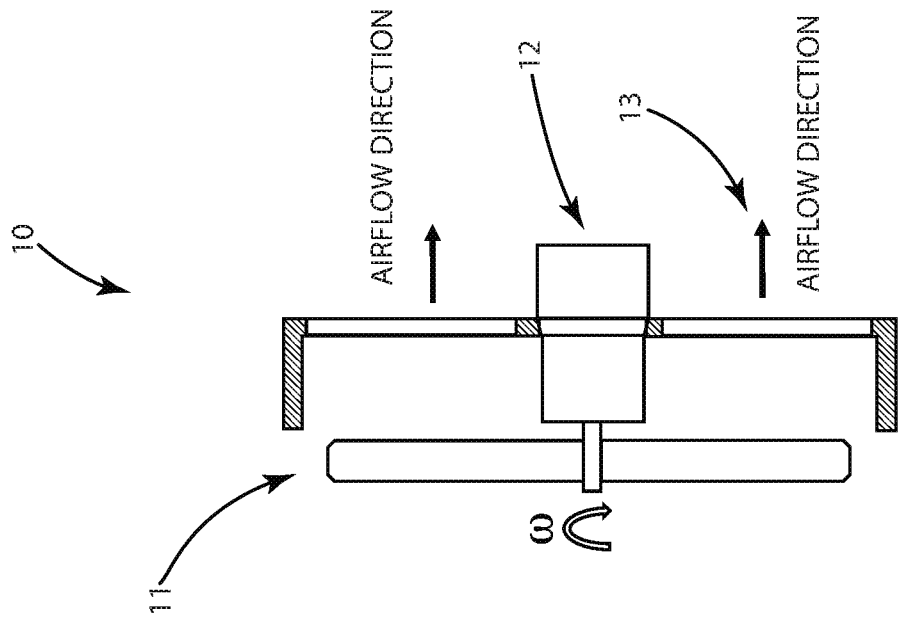
FIGS. 1A-B illustrates a commercial fan or blower diagram in operation showing the rotating fan wings and the airflow direction prior to motor starting moment and motor startup control.

The present disclosure provides a system and method for robust control of a sensorless motor, such as an interior permanent magnet synchronous motor ("IPMSM"). One aspect of the present disclosure relates to a system and method for closed-loop startup control of a motor from any practical starting motor condition. The startup control is reliable and robust, based on feedback provided to the motor control throughout startup. Regardless of initial motor operational conditions in the field, the systems and methods of the present disclosure can automatically adapt to provide robust and reliable motor startup—even where the motor rotor is moving during the starting moment and not in a standstill state (i.e., zero or low speed, such as a few RPM).

Motor startup can be executed in a closed loop fashion, based on feedback about the rotor speed, or other rotor characteristics. The robust startup control systems and methods can utilize closed loop control of the motor across the entire speed range of the motor, from any initial speed, through the startup control process, to normal operational control, at any operational speed, thereby achieving robust motor starting control.

The systems and methods of the present disclosure can operate without open loop control, where commands are issued to the motor that are not based on feedback to the motor controller. A braking system or other open loop control system is not a requirement as it is in many other PMSM systems because the systems and methods of the present disclosure can provide motor starting control without having to apply brakes (or another open loop control mechanism) to ensure the motor is in a standstill condition (or another required state).

One aspect of the disclosure focuses on use of a programmed rotor speed detection operation at or during the starting moment. In some embodiments, the motor controller is configured to execute a programmed rotor speed detection operation to: 1) provide rotor characteristic feedback based on rotor movement at or during the starting moment; and 2) to select which motor startup speed detection estimation to use after the rotor movement detection operation is complete (e.g., a flux observer rotor speed estimation or a high frequency injection rotor speed estimation). The selected initial motor startup speed estimation can be used for startup motor control initially and can dynamically change throughout startup as the motor speed changes.

It is worth noting that although the disclosure focuses on complete closed-loop control, some embodiments could intelligently incorporate open loop control or incorporate closed loop braking. For example, should the rotor movement detection operation detect a small rotor movement, instead of trying to account for the rotor movement in the startup DFC (or ignoring it as de minimus), the motor could apply brakes to completely stop the motor, then start. Such control could be provided in as open loop control where the motor starts without feedback that the motor has stopped or in a closed loop fashion where further feedback is obtained to ensure the motor is has stopped moving.

Another aspect of the present disclosure is directed to application of high frequency injection not only for zero and very low speeds where any slow rotation of the rotor and corresponding stator response currents can largely be ignored, but also for speeds above that (e.g., between 10 RPM and 200 RPM) where the stator current response due to rotation of the rotor cannot be ignored. The application of high frequency injection and handling of the stator current response within the context of a rotating motor rotor is referred to throughout this disclosure as dynamic high frequency injection ("DHFI"). In essence, by filtering the stator response currents in a first suitable manner, the response to the high frequency signal injection can be decoupled from the response associated with the rotor movement. That is, the high frequency response can be isolated from the stator current changes associated with rotation of the rotor. Further, by filtering the stator response currents in a second suitable manner, the high frequency signal can be filtered away from the fundamental current feedback for the stator flux observer to avoid interruption of the motor control. That is, if HFI is activated while the rotor is moving and it is not filtered out before the signals are processed by the flux observer, the estimated result can carry the interruption or fluctuation in the output, which can affect the system response and ultimately the integrity of the output motor control signals. As discussed in more detail later, a variety of different decoupling methodologies can be utilized to decouple the desired signal or signals.

Another aspect of the present disclosure is directed to executing multiple closed loop speed estimations in parallel. Different types of rotor speed estimations can be more reliable at different points in the motor startup process and the motor controller may be configured to switch between different speed estimation methods as the motor speed changes.

Starting and stopping different speed estimation methods can be resource intensive and/or cause timing issues. For example, high frequency injection speed estimations are generally more reliable for lower starting speeds while stator flux observer speed estimations are generally more reliable at higher starting speeds and therefore it may make sense to dynamically change which speed estimation is utilized in the motor control method, such as direct flux control. However, instead of estimating speed by one method or another mutually exclusively, multiple speed estimation methods can be operated in parallel, and the control method can dynamically change which speed estimation method's output is active. The one or more other speed estimation methods can be run in parallel so that if a change in speed estimation method is suitable, the output of the non-active speed estimation method is readily available. As a compromise to executing two or more speed estimation techniques in parallel at all times, the control system can be configured such that multiple speed estimation methods can be executed in parallel while the motor speed is within an overlapping range of values. For example, this can be seen in FIG. 11 where DHFI remains active from motor speeds of $-\square_2$ to $-\square_2$, but is only the active speed estimation method during motor speeds of $-\square_h$ to $\square_h$. Obtaining a reliable high frequency injection speed estimate involves generating and injecting a high frequency signal into the motor stator windings and waiting for the stator current response, which can take time to settle. By utilizing DHFI to decouple the HFI signal from the stator current response to rotor movement, the flux observer speed estimation can be carried out in addition to obtaining a speed estimation based on the saliency of the motor using the response to the HFI.

Another aspect of the present disclosure is directed to startup motor control transitions in real-time among multiple different control methodologies. In one embodiment, a comprehensive starting control method applies control flags in real-time. The starting process operates in a closed loop control for any initial speed to the designation speed, including standstill speed (e.g. −10 to 10 Rpm), low starting speeds (e.g. −10 to −200 Rpm & 10 Rpm to 200 Rpm), medium starting speed (e.g. −200 Rpm to −250 Rpm & 200 Rpm to 250 Rpm), and high starting speed (e.g. >250 Rpm & <−250 Rpm). These speed ranges are exemplary and different applications and embodiments may be implemented with different values and different ranges. In some embodiments, there may be additional, different, or fewer numbers of ranges of motor speed categories. In some embodiments, the particular motor speed ranges and the transitions there between may be dictated in part by the particular motor speed estimation methods implemented in that particular embodiment. The closed loop control can continue for normal operation including low operational speed, medium operational speed, and high operational speed, which can vary depending on the application. The process also can handle rotation in either bi-rotating direction. The ability to transition between motor control methodologies during startup where the motor speed may be variable within a wide range provides a secure, robust starting process for motor control startup speeds to operational speeds.

I. Overview of Exemplary IPMSM and Motor Control System

Figure 1A:
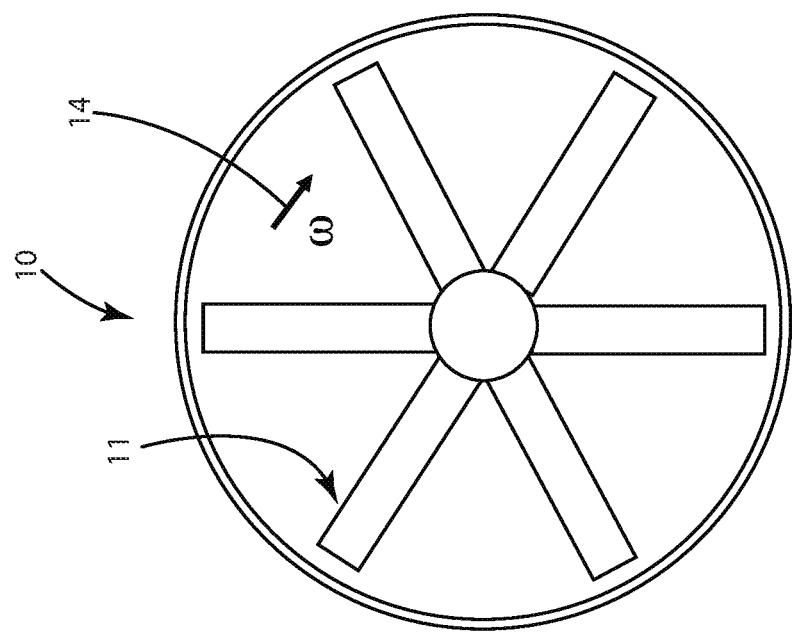

Various components and functional blocks along with their integration into the motor control system will now be described in detail. FIGS. 1A and 1B illustrate front and side diagrammatic views of an exemplary commercial fan structure 10. The figures show exemplary components including fan blades 11, a permanent magnet synchronous motor ("PMSM") 12, and the axial airflow direction 13. When the fan blades 11 are driven by the PMSM to run at a certain speed and rotating direction 14, the blades generate a pressure to push the airflow 13 through the fan. When driven by the PMSM 12, the fan 10 can produce the specified airflow 13 to satisfy an airflow requirement based on the configuration or programming of the motor electronics, typically incorporated within the motor itself. The blades 11 can also rotate without power due to natural wind mobility, referred to as wind-run. The wind-run rotating direction can be clockwise or counter-clockwise and is more-or-less random.

A number of the components and control elements suitable for use in embodiments of a sensorless IPMSM of the current disclosure are described in described in U.S. application Ser. No. 16/795,074, entitled SYSTEM AND METHOD FOR INTERIOR PERMANENT MAGNET SYNCHRONOUS MOTOR CONTROL FROM ZERO OR LOW SPEED, filed on Feb. 19, 2020, to Bojoi et al., which is hereby incorporated by reference in its entirety.

In some embodiments, the PMSM 12 is an electrically controlled motor ("ECM") that includes a motor, controller, and interface integrated together. Throughout the disclosure, the ECM may be referred to generally as a motor or PMSM. Due to the space restrictions in many commercial fan applications, permanent magnets of rare earth magnet material, such as Neodymium Iron Boron (NdFeB), are normally used as the rotor magnets. Further, the PMSM can be an interior permanent magnet synchronous motor ("IPMSM") with permanent magnets set within the interior of the rotor.

Figure 2:
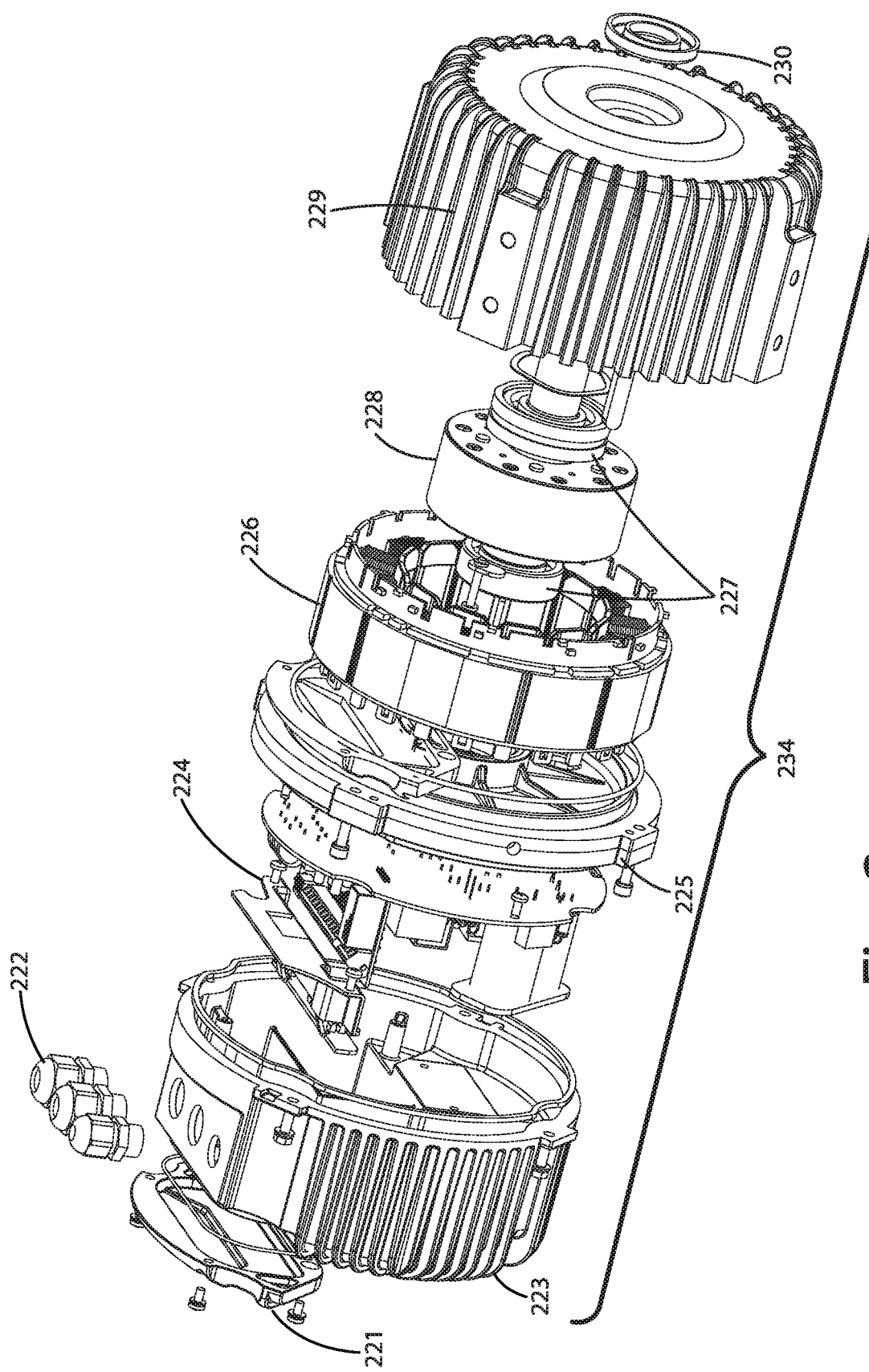
FIG. 2 illustrates an exploded view of an IPMSM in accordance with one embodiment of the present disclosure.
Figure 3A:
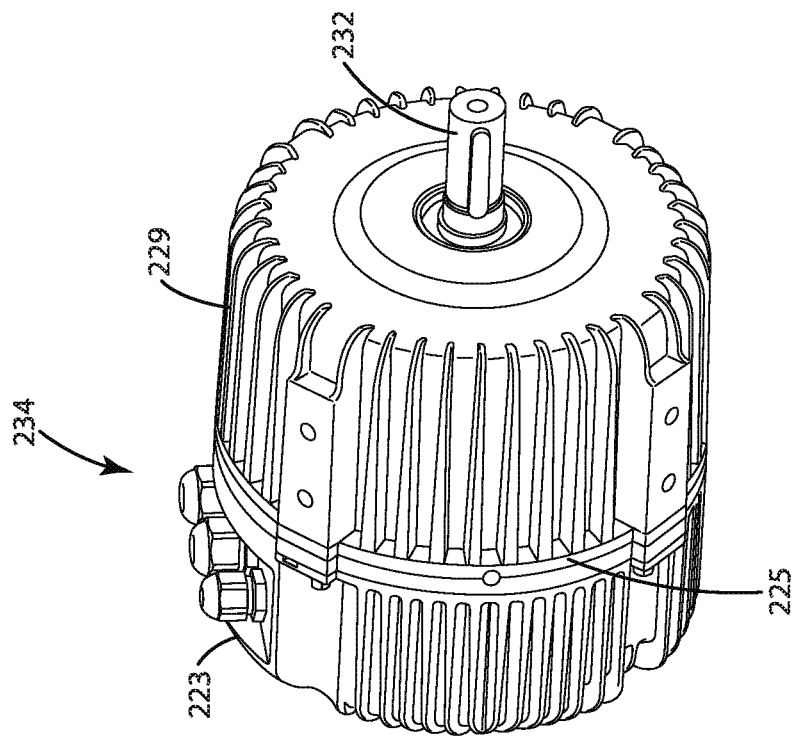
FIGS. 3A-B illustrate assembled front and rear perspective views of the IPMSM of FIG. 2.
Figure 3B:
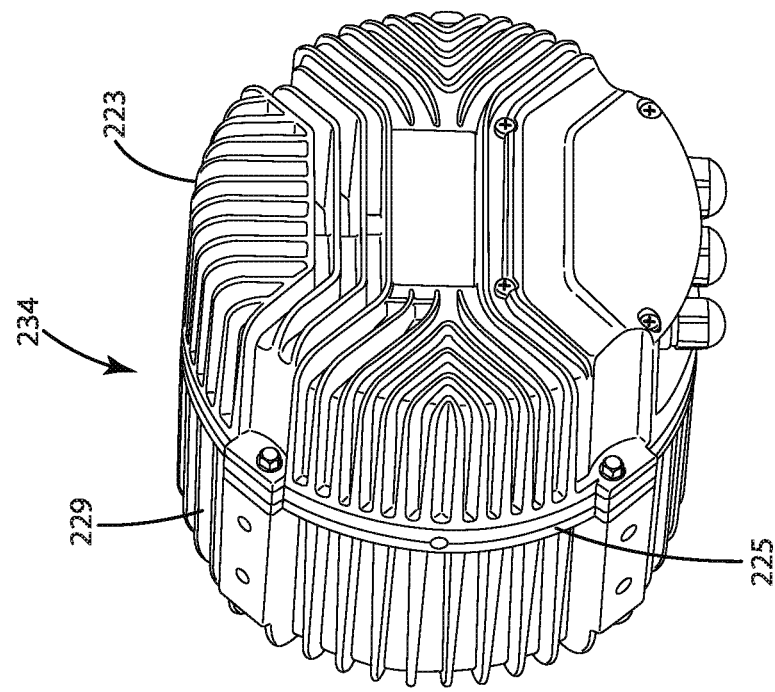

FIG. 2 illustrates an exploded view of one embodiment of a commercial fan ECM including PMSM 12, while FIG. 3A illustrates a rear view of the PMSM 12 and FIG. 3B illustrates a front, shaft-side, perspective view of the PMSM 12. The depicted embodiment of the motor 12 has a housing or enclosure 234 that includes a rear-end shield 223, a front-end shield 229 and mid shield 225. The three shields are joinable to cooperatively form the enclosure 234 of the motor 12. The rear-end shield 223 and the mid shield 225 form a sealed enclosure for the PMSM electronics including a motor control system 224. A lubricant or oil seal 230 can surround the drive shaft 232 that extends out of the motor enclosure 234 and seals the front-end shield 229. In alternative embodiments, the motor enclosure can be formed from additional, fewer, or different constituent components that cooperate to house the motor in essentially any suitable way that enables the motor 12 to convert electrical energy into mechanical energy, for example to rotate the drive shaft.

The motor 12 of the current embodiment includes a motor control system 224, a stator 226, and a rotor 228. The motor control system 224 may be mounted and sealed within a separate cavity in the motor, for example via cooperation of the rear sealed end-shield 223 and the sealed mid-shield 225. The motor control system 224 is capable of driving multiphase AC electromagnetics of the stator 226 to create a magnetic field that rotates in time with the oscillations of the line current. Once at steady state, the rotor, for example via permanent magnets embedded in the rotor, turns in step with the stator 226 and as a result rotates the drive shaft 232 of the stator. The motor may include bearings 227 that support and locate the rotor to keep the air gap between the stator 226 and the rotor 228 small and consistent. The motor control system 224 may include a controller on a printed circuit board coupled to the end-shield 223 in construction for heat dissipation generated by the electronic components.

A wire cover 221 may be secured or integrally formed with the rear-end shield 223. During installation or service, the cover 221 can be opened to access connectors 222. In the current embodiment, the wire cover is waterproof and includes a rubber seal. Waterproof electrical connectors 222 can provide for routing, connecting, or otherwise coupling to the motor control system 224 and stator 226. In the current embodiment, the three connectors 222 provide a connection interface for three-phase power cables, command cables, and sensing-monitoring cables.

Figure 6:
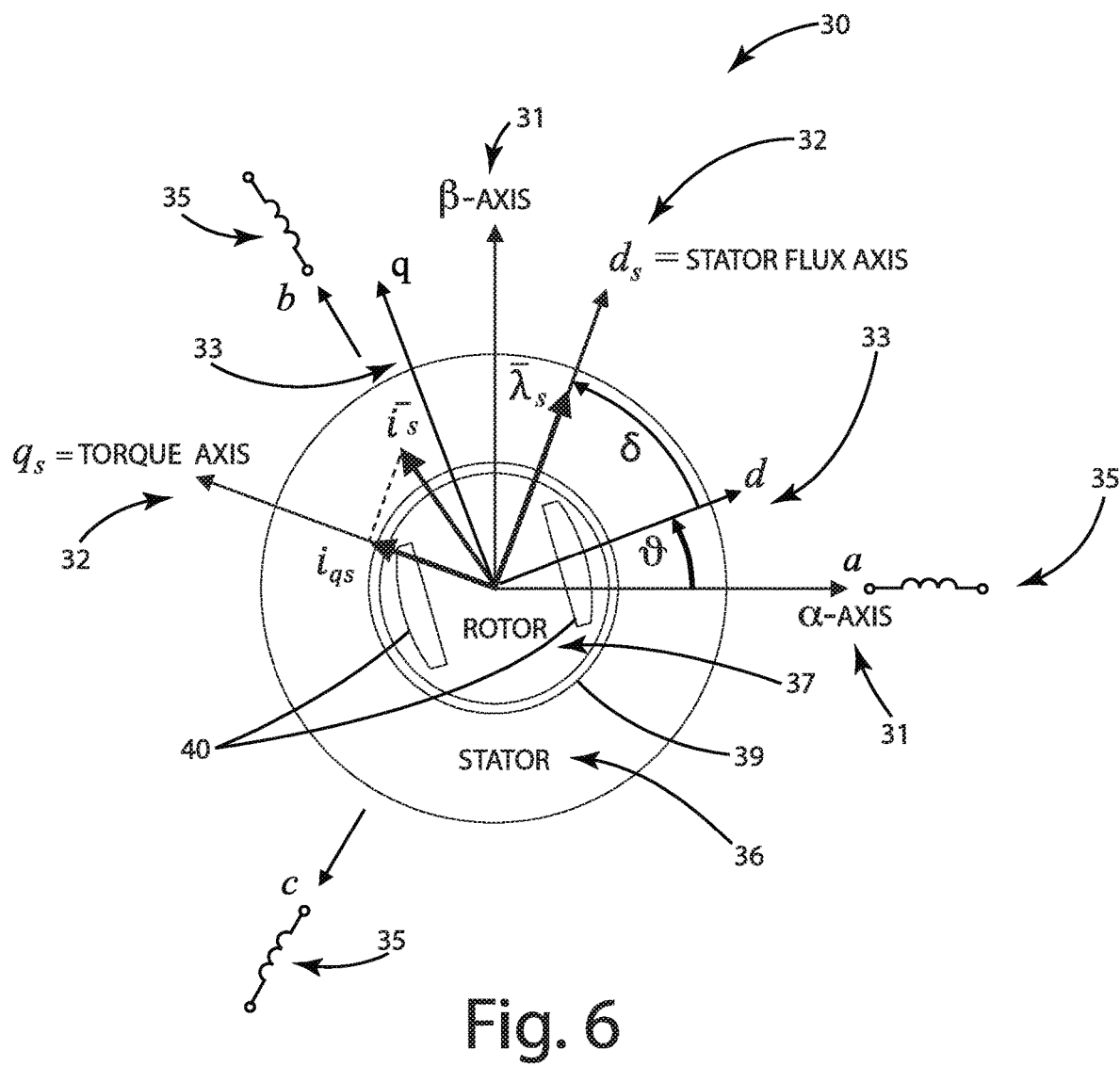
FIG. 6 illustrates the direct-quadrature stator reference frame, direct-quadrature rotor reference frame, stationary reference frame, and the three-axis reference frame.

Perhaps as best shown in FIG. 6, in the illustrated embodiments, the motor is an interior permanent magnet synchronous motor (IPMSM). A typical interior permanent magnet motor rotor structure, such as that of the current embodiment, has characteristics of magnetic saliency, i.e., the motor inductances ($L_d$, $L_q$) are not equal. Permanent magnets 40 are embedded in the rotor 37 and there is an air gap 39 between the rotor 37, 226 and the stator 36, 228. The stator 228 includes windings (a, b, c) 35 that can be powered by the motor control system 224 to generate a rotating magnetic field around the airgap 39. Essentially, any IPM motor configuration can be implemented where the magnets are arranged such that the motor inductances are not equal. Although the depicted embodiment includes two magnets, other arrangements with additional magnets are suitable that provide non-equal motor inductances ($L_d$, $L_q$)

The configuration, arrangement, and selection of PMSM components in the depicted embodiments are exemplary. Alternative embodiments can include additional, different, or fewer components. For example, although the current embodiments are described within the context of the depicted IPMSM motor, other embodiments can be implemented that use another type of sensorless brushless permanent magnet motor (BPM), sensorless electrically controlled motor (ECM), sensorless vector controlled motor system, or other type of sensorless variable speed motor construction and configuration.

Figure 4:
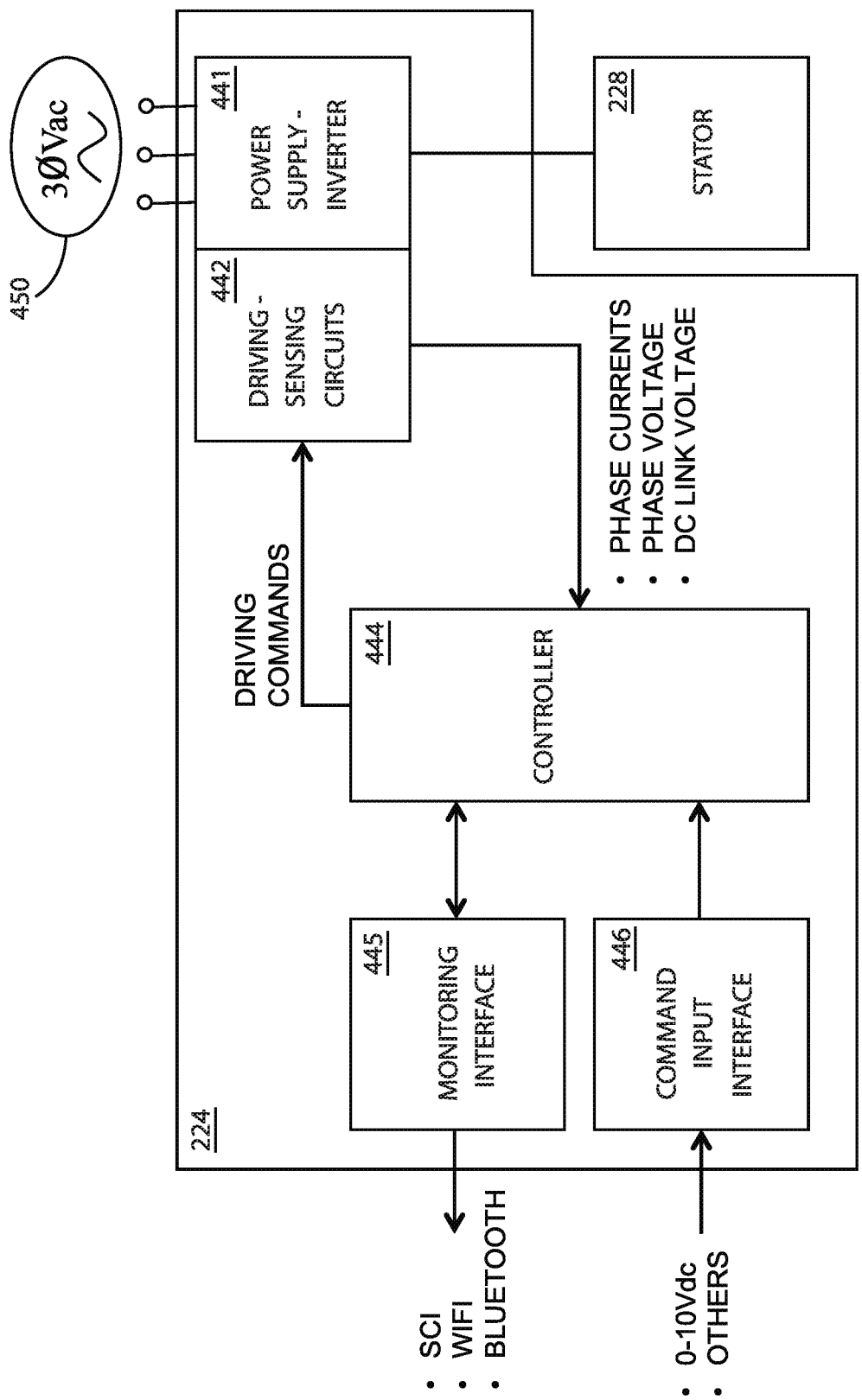
FIG. 4 illustrates a block diagram in accordance with one embodiment of the present disclosure.

Referring to FIG. 4, an overview of a motor control system 224 in accordance with the present disclosure will now be described. Generally, the motor control system 224 may include one or more microcontrollers, microprocessors, and/or other programmable electronics that are programmed to carry out the functions described herein. The motor control system 224 may additionally or alternatively include other electronic components that are programmed to carry out the functions described herein, or that support the microcontrollers, microprocessors, and/or other electronics. The other electronic components can include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards or arranging them in another manner, whether combined into a single unit or distributed across multiple units. Such components may be physically distributed in different positions in the motor 12, or they may reside in a common location within the motor 12, such as within the sealed enclosure formed by the rear-end shield 223 and the mid-shield 225. When physically distributed, the components may communicate using any suitable serial or parallel communication protocol, such as, but not limited to SCI, WiFi, Bluetooth, FireWire, I2C, RS-232, RS-485, and Universal Serial Bus (USB).

Referring to FIG. 4, one embodiment of the motor control system 224 includes a combination of a variety of different electronic components, including, but not limited to, power supply circuitry 441 to convert source power 450 to a suitable voltage, current, and frequency, driving circuitry 442 to drive the motor stator windings based on driving commands, sense circuitry 442 to sense one or more motor characteristics for use in the one or more motor control methods or motor speed estimation methods, a controller 444 to implement one or more motor speed estimation methodologies or one or more motor control methodologies and provide driving commands to the driving circuitry based on the sensed motor characteristics, a monitoring interface 445 for monitoring motor operation including the one or more motor control methodologies, and a command input interface 446 for providing various command inputs to the controller 444.

Portions of the driving and sensing circuitry 442 used to implement various embodiments of the robust motor starting methods described herein can be the same driving and sensing circuitry 442 utilized to implement other known motor control methods. For example, the driving and sensing circuitry can include three-phase full bridge topology, along with sensing circuitry capable of detecting various stator characteristics, such as stator phase currents and stator voltages. In one embodiment, the sensing circuitry is capable of detecting stator phase currents, stator phase voltages, and DC link voltage. That is, hardware configurations of the driving and sensing circuitry 442 can be utilized to implement embodiments of the starting method described herein. In alternative embodiments, the sensing circuitry 442 may include circuitry to sense additional, different, or fewer characteristics. The controller 444 can include memory, or have access to memory located on a shared circuit board or located elsewhere within the motor. The memory can contain various operating parameters in connection with the various control and speed estimation methods.

The controller 444 can be configured with a rotor characteristic detection method, such as the rotor characteristic method described in U.S. application Ser. No. 16/795,074, filed on Feb. 19, 2020, by Bojoi et al. entitled "SYSTEM AND METHOD FOR INTERIOR PERMANENT MAGNET SYNCHRONOUS MOTOR CONTROL FROM ZERO OR LOW SPEED", which was previously incorporated by reference in its entirety. Detecting rotor position with a rotor position detection method refers to detecting or estimating the position of the rotor relative to the motor stator. The position can be obtained or translated to essentially any suitable coordinate system. For example, some embodiments of the motor control system 224 include translating stator current measurements ($i_{abc}$) into the stationary or dq frames of reference. Rotor magnetic polarity can be abc, detected utilizing a rotor polarity detection method.

The controller can detect rotor position and rotor speed, for example utilizing a stator flux observer and/or high frequency injection method, with or without polarity detection, to determine the initial condition of the rotor during the starting moment (e.g., standstill, positive wind-run, or negative wind-run), and then select a suitable control methodology accordingly, for example based on a mapping between rotor speed and control methodology. The motor control system can vary the speed estimation used based on the initial speed detected and as the rotor speed changes during startup.

A number of different control and rotor characteristic detection methodologies are suitable for use in connection with the embodiments of the present disclosure. Some embodiments can provide an overarching robust starting method for a PMSM that operates utilizing closed loop control from essentially any practical starting motor condition. That is, in some embodiments, regardless of initial motor conditions, the motor can be operated exclusively with a closed loop control system. The underlying algorithm of the closed loop control system may vary as detected rotor speed varies over startup, but the motor control system can be started without having to resort to open loop control, which is generally poorly equipped to handle disturbances or changes in the system.

Figure 5:
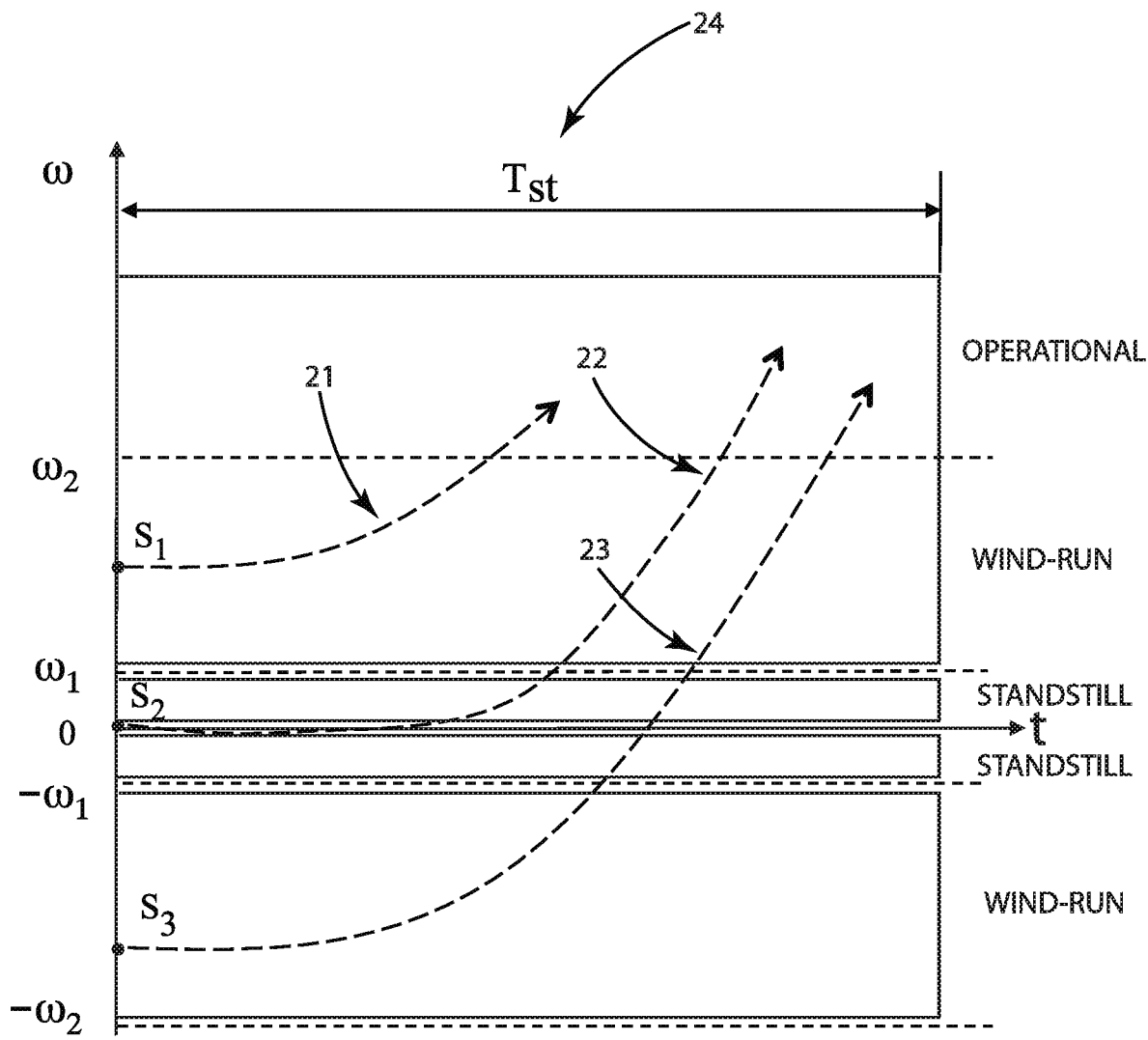
FIG. 5 illustrates exemplary starting modes for sensorless control of a PMSM for a commercial fan application.

Referring to FIG. 5, it shows a diagram that shows exemplary fan starting conditions and fan speeds throughout motor startup. Unlike a traditional three-phase AC induction motor, synchronous permanent magnet motor driven systems utilize a starting method. Starting the rotor of a PMSM can be challenging in commercial and industrial applications, for example because the starting conditions of the rotor, i.e., its position and speed may not be known at start-up and rotor characteristic detection methods that are reliable during normal operation may not be reliable at startup. The FIG. 5 graph is helpful in showing some exemplary fan starting conditions and exemplary execution of one embodiment of the present disclosure over a startup period $T_{sr}$, 24. The horizontal axis shows time t, and the vertical axis shows rotor speed $\omega$.

The diagram shows three major motor speed zones: standstill, wind-run, and operational. Based on these exemplary motor speed zones, one or more different motor starting procedures can be defined that account for some or all of the motor speed zones. The motor controller can be configured to ramp the motor speed to a target speed in the operational zone depending on the initial motor speed and the motor speed values estimated during closed loop motor control startup, collectively referred to as the starting motor speed. For example, the motor controller can control the motor differently according to which defined motor speed cases are detected and then transition between the various motor control functions accordingly.

Estimated speeds during startup closed loop motor control in three different scenarios ($S_1$ 21, $S_2$ 22, $S_3$ 23) are illustrated in FIG. 5. It should be understood that as the estimated speeds for each scenario transition from one rotor speed zone to the next, the closed loop control adapts to the closed loop control associated with that estimated speed. This may involve using a different control algorithm. The change to the control algorithm may involve one or more of additional rotor characteristic estimations (e.g., to supplement the accuracy of the estimated rotor characteristics), changing the control algorithm input (e.g., to utilize more reliable rotor characteristic estimations and associated values), or utilizing different control logic (e.g., logic better suited for the current estimated rotor characteristics). The initial startup motor control cases correspond to the main speed zones discussed above: standstill, positive wind-run and negative wind-run.

The term observer (e.g., closed-loop observers, such as flux stator observer and high frequency angle observer) and any other functional modules described herein designate parts of controller 444 or control system 224. Aspects of these functional modules may be stored in memory of the controller 444, and may also form part of the controller configuration such that they are part of the controller 444 that is configured to operate, receive, and translate one or more inputs and to output one or more outputs. That is, these various modules can form part of the controller 444 configuration such that the controller 444 is configured to receive one or more inputs from sensing circuitry in conjunction with an embodiment of a rotor characteristic detection method and output one or more driving commands associated with a motor control method to the driving circuitry for the motor.

The adopted vector reference frames are defined in FIG. 6, for a radial interior PMSM motor 30 according to an embodiment of the present disclosure. The motor 30 includes a stator 36, rotor 37, and air gap 39 between. The stator 36 includes three-phase windings (a-b-c) 35, if powered on, carrying three-phase currents respectively ($i_a$, $i_b$, $i_c$); these current values can be transformed into the stationary frame ($\alpha$-$\beta$ axis) 31. The rotor 37 rotating at a synchronous speed can be in a saliency structure, resulting in different permeabilities and inductances between the pole central line d-axis and the perpendicular line q-axis, referenced together as the synchronous rotor frame (d-q axis) 33. For example, the rotor structure of rotor 37 is a two pole (e.g., permanent magnets 38) rotor design in order to ease explanation. However, the various embodiments are not limited to rotors with two poles and work equally well with rotors having additional poles, such as 10, 12, or more poles.

Stator three-phase windings ($i_a$, $i_b$, $i_c$) generate a rotating magnetic field or stator flux vector $\bar{\lambda}$ on the reference frame of stator flux $d_s$-axis versus torque $q_s$-axis ($d_s$-$q_s$ axis) 32. The d-q axis 33 represents the rotor flux position at synchronous speed while the $d_s$-$q_s$ axis represents the stator flux position at synchronous speed. The torque angle $\delta$ represents the angle in radians between the rotor flux axis d and the stator flux axis $d_s$. The position of the rotor 37 can be represented relative to the stationary reference frame ($\alpha$-$\beta$ axis) 31 by the angle $\nu$ in radians from the $\alpha$-axis and the position of the stator relative to the stationary reference frame ($\alpha$-$\beta$ axis) 31 can be represented by the angle $\nu_s$ in radians from the $\alpha$-axis.

The relative positions of the reference frames and various characteristics depicted in FIG. 6 generally reference the situation where three-phase windings generate a rotating magnetic field at synchronous speed within the operational speed zone. However, the same reference frames and characteristics can be referenced where three-phase windings generate a rotating magnetic field during startup, before reaching synchronous speed. That is, a sensorless synchronous permanent magnet motor control system implements a startup motor control method to facilitate starting operation of the motor. The startup motor control can employ different strategies to handle various conditions, such as specific rotor characteristics including rotor position and rotor speed. For example, the startup motor control can be initially configured based on initial rotor speed and reconfigured based on rotor speed as it changes during startup. In some embodiments, the startup motor control can be configured based on a comparison between estimated rotor speed and the speed ranges defining the different speed zones mentioned above.

II. Overview of Motor Control System with Direct Flux Control

Control elements for a motor control system including integration of a direct flux control subsystem and method will now be described to provide context for the various features and aspects of the present disclosure.

Sensorless Direct Flux Control ("DFC"), sometimes referred to as field orientation control ("FOC") or direct torque control ("DTC"), of PMSM systems is well-known and rooted in frame transformation theory. The motor voltage, current, and flux stator vectors, are represented by $\bar{v}$, $\bar{i}$ and $\bar{\lambda}$ respectively. The adopted vector reference frames are defined in FIG. 6, which illustrates a radial interior permanent magnet synchronous motor (IPMSM) 30. Specifically, the IPMSM of FIG. 6 includes the following reference frames: stationary frame ($\alpha$-$\beta$), 31, rotor frame (d-q) 33, stator flux frame ($d_s$-$q_s$) 32, and three-phase winding reference frame (abc).

DFC methods typically are implemented with stator flux vector coordinates ($d_s$-$q_s$) 32. The stator flux magnitude is directly regulated by control of the $d_s$-axis voltage component. Accordingly, the $d_s$-axis becomes the flux axis $\bar{\lambda}$ as shown in FIG. 6. The torque is regulated by control of the $q_s$-axis current component. Accordingly, the $q_s$-axis becomes the torque axis $\bar{i}_{qs}$ as shown in FIG. 6.

Figure 7:
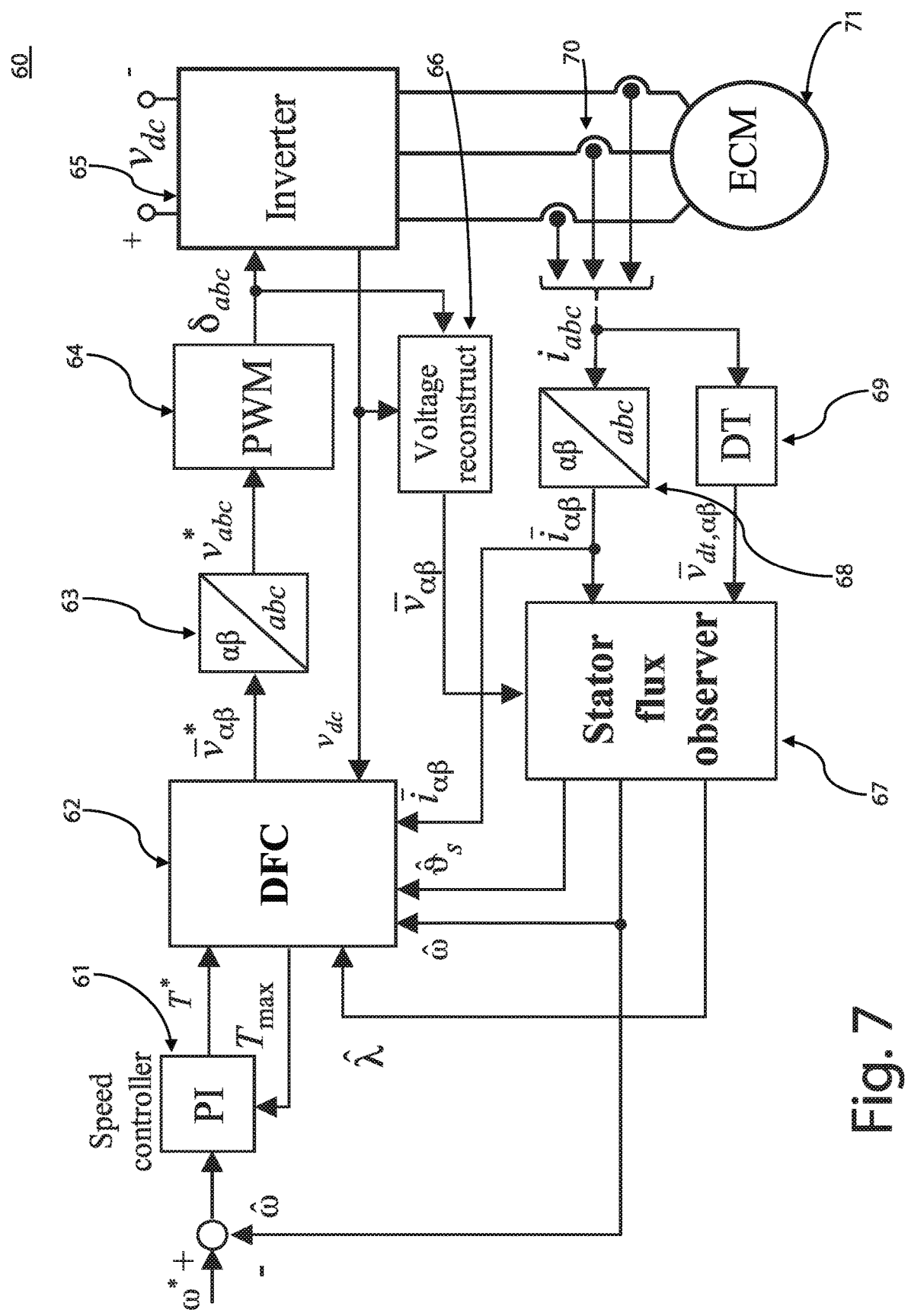
FIG. 7 illustrates a sensorless permanent magnet motor control system diagram showing representative functional blocks.

FIG. 7 illustrates a motor control functional block diagram 60 incorporating a DFC system. In particular, the control scheme utilizes closed loop direct flux control ("DFC") 62 to generate adjustments for the stator currents that can be translated and applied to the stator windings of the motor via the pulse-width modulated signals to the inverter. The change in voltage to the stator windings changes the speed of the motor 71. The functional block diagram 60 highlights various inputs and outputs of the DFC 62 as well as some of the functional control elements involved.

There are four main functional control blocks arranged along the top of the diagram 60: the speed controller 61, the DFC 62, the frame transformation 63, and the pulse width modulation (PWM) generator 64. Each of these bocks are briefly described below.

The speed controller 61 can be implemented as a proportional-integral ("PI") control that outputs a torque command T*, sometimes referred to as a torque reference, based on inputs of rotor speed error (i.e., a comparison between a rotor speed reference or command ω* and estimated electrical rotor speed $\hat{\omega}$) as well as the maximum torque $T_{max}$ limit. The speed control can be implemented in a separate controller or integrated with another controller. Although a PI algorithm is utilized in the current disclosure, essentially any speed control algorithm can be implemented, such as proportional-integral-derivative ("PID") control algorithm, model predictive control ("MPC") algorithm, or another type of speed control.

With reference to the direct flux control 62, the torque command T* provided by the speed controller 61 represents a target torque value for the DFC 62 to control towards. Based on its various inputs, the DFC 62 generates an output signal that attempts to provide that amount of torque in the motor. Specifically, the DFC 62 outputs a command voltage vector in the stationary frame $\bar{v}^*_{\alpha\beta}$, which, when properly translated 63, processed 64, and applied to the motor stator windings via the inverter 65, creates voltage signals that drive the motor 71 toward the target torque value indicated by the torque command T*. Put another way, the DFC receives a reference torque and outputs control signals that ultimately are used to drive the inverter 65 toward the reference torque.

The frame transformation 63 of the current embodiment transforms the output from the DFC from the stationary frame (α-β) 31 to the real-time three-phase frame (abc) 35. In the depicted embodiment, the output from the DFC is a voltage vector in the stationary frame and the frame transformation 63 converts that voltage vector to a real-time three-phase frame voltage vector that can be used to ultimately drive the motor to provide the desired torque.

In addition to the four main functional control blocks 61, 62, 63, 64, the motor control functional block diagram 60 includes the inverter 65, the motor 71, as well as a number of functional feedback blocks 66, 67, 68, 69, 70 related to providing feedback to the functional control blocks. The inverter 65 is coupled to the three-phase windings of the electrically controlled motor ("ECM") and can generate signals that drive the motor. The DC voltage input to the inverter 65 can be controlled according to the pulse width modulated signals output from the PWM generator 64 to produce a desired set of three-phase currents ($i_{abc}$). In particular, the PWM generator 64 receives real-time three-phase voltages from transformation 63 and prepares appropriate control signals for the inverter 65 to generate the desired torque angle by applying the appropriate voltage to the three-phase windings.

One source of feedback in the functional block diagram 60 are the three-phase current sensors 70 that sense the current in the stator windings. It is well-known that there is a relationship between the current in the stator windings and the current or flux in the rotor windings. Accordingly, there are a variety of different methods to estimate characteristics about the motor rotor, such as rotor position and rotor speed, based on the sensed currents of the three-phase windings. An experimental or trial based lookup table (LUT) can convert the real-time three-phase stator currents $i_{abc}$ into a voltage vector in the stationary frame $\bar{v}_{dt,\alpha\beta}$ using a dead-time compensation table 69 for the inverter. The real-time three-phase stator currents can also be translated to the stationary frame and provided to both the stator flux observer 67 and the DFC 62.

Other sources of feedback in the functional block diagram 60 include the voltage feedback reconstruction 66 that reconstructs the stationary frame voltage vector from the input DC voltage $v_{dc}$ and torque angle voltages $\delta_{abc}$ into a voltage vector in the stationary frame $\bar{v}_{\alpha\beta}$.

The control system can also include a stator flux observer 67, which will be discussed in more detail later along with a frame transformation 68 for transforming the three-phase stator currents ($i_{abc}$) to a stator current vector in the stationary frame $\bar{i}_{\alpha\beta}$.

Details about the functional blocks illustrated in FIG. 7 will be understood by those of ordinary skill in the art. Further, some of the functional blocks of diagram 60 are described in U.S. application Ser. No. 16/795,074, entitled SYSTEM AND METHOD FOR INTERIOR PERMANENT MAGNET SYNCHRONOUS MOTOR CONTROL FROM ZERO OR LOW SPEED, filed on Feb. 19, 2020, to Bojoi et al., which was previously incorporated by reference in its entirety.

III. DFC Introduction

Figure 8:
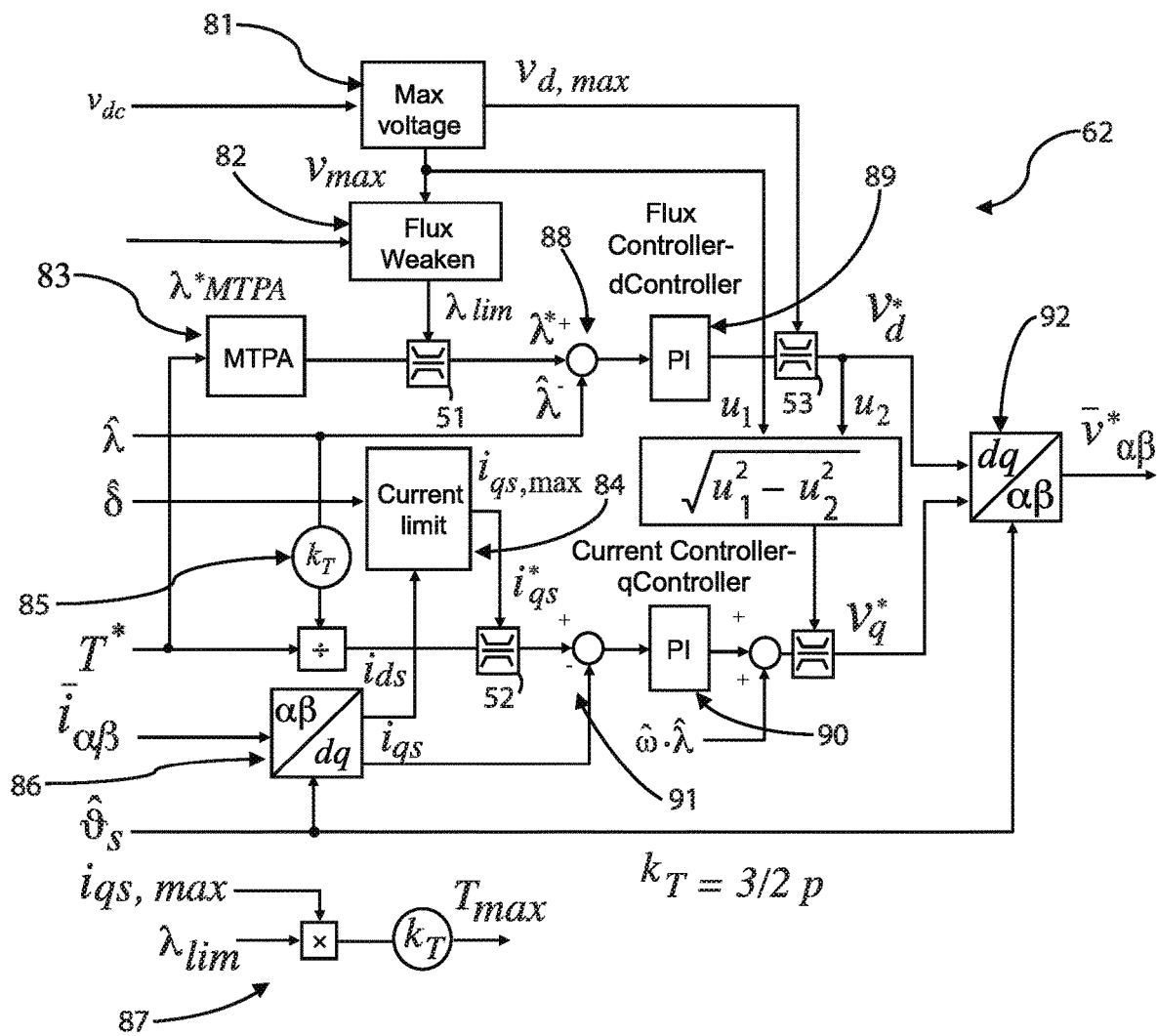
FIG. 8 illustrates an exemplary implementation of direct flux control showing representative functional blocks with inputs, output control vector variables, and control logic.

An exemplary version of the direct flux control or direct field control ("DFC") block 62 from FIG. 7 will now be described in greater detail with reference to the functional block diagram 80 of FIG. 8 depicting one DFC implementation. DFC 62 provides a motor control scheme for torque regulation. The torque reference T* input is generated by an outer speed regulation loop that is implemented by PI speed controller 61, as discussed above. The outputs of the DFC block include the command voltage vector $\bar{v}^*_{\alpha\beta}$ as transformed by transformation 92 to the stationary reference frame and the maximum torque $T_{max}$ provided by limit function 87 as feedback to the speed controller 61 that represents the maximum amount of torque that the motor can generate in its current condition, given current limitation and available voltage. The maximum torque $T_{max}$ can be used by an anti-wind-up mechanism of the speed controller 61.

As shown in FIGS. 7-8, the current embodiment of the DFC 62 utilizes the following inputs or feedback parameters:

Torque command or reference Torque, T*

Estimated stator flux magnitude $\hat{\lambda}$, the stator flux linkage vector by flux observer;

Estimated electrical rotor speed $\hat{\omega}$ provided by the flux observer;

Measured stator current vector $\bar{i}_{\alpha\beta}$ in stationary (α-β) reference frame;

Estimated electrical rotor position $\hat{v}_s$ provided by the flux observer;

Measured inverter DC link voltage $v_{dc}$

A number of these inputs can be provided directly or indirectly by the stator flux observer 67 (e.g., estimated stator flux magnitude, estimated electrical rotor speed, estimated electrical rotor position). The stator current vector in the stationary frame can be provided based on stationary frame transformation 68 of the three-phase sensed current from the current sensor 70. The estimated magnitude and estimated position can be provided by the flux observer 67 in the form of the magnitude and vector of the stator flux linkage vector in the stationary reference frame. As mentioned above, the torque command or torque reference that the control system is attempting to control towards can be provided by a separate speed controller 61 operating on a separate control loop. The inverter DC link voltage can be provided by the DC bus voltage feedback from the inverter 65.

FIG. 8 shows an exemplary functional schematic of DFC 62 block. In general, the DFC block diagram 80 shows the DFC inputs, outputs, and various internal parameters, including vector variables, and the control logic. The depicted DFC 80 has two proportional-integral ("PI") control loops, implemented by two separate controllers 89, 90. Although illustrated as separate functional blocks, they can be implemented as separate physical controllers, a single unified controller, or distributed across more than two controllers and/or other components. One controller is a flux controller 89, referred to as a dController, and one controller is a current controller 90, referred to as a qController. The dController 89 takes the flux error 88 as input. The flux error 88 is a combination of the reference flux λ* and actual stator flux $\hat{\lambda}$. The qController 90 takes the current error 91 as input. In the current embodiment, the current error 91 is a combination of the reference stator quadrature current i*$_{qs}$, and the quadrature stator current i$_{qs}$.

The DFC scheme 80 depicted in FIG. 8 has two control loops, a flux-based control loop 89 to determine a direct axis component of a voltage vector and a current based control loop 90 to determine a quadrature component of a voltage vector. Control loop 89 is associated with and configured in conjunction with components that combine the depicted inputs to determine a d component of rotor movement, while control loop 90 is associated with various components and functions to determine the q component of the rotor movement that is at a quadrature angle to the direct component. Together, when effectively applied to the motor, the dq voltage vector will achieve or substantially achieve the command torque T* commanded by the speed controller 61.

The DFC diagram includes several additional functional blocks, such as a max voltage block 81, a flux weakening control block 82, a maximum torque per ampere ("MTPA") control block 83, a current limit block 84. These and the other functional blocks depicted in FIG. 8 generally relate to special functionalities in the general motor control field, and do not directly relate to features and aspects of the present disclosure, and therefore will not be explained or discussed in detail.

IV. Universal dqController

In one aspect of the present disclosure, the motor controller is configured to start a PMSM for a commercial fan and blower drive application and the motor includes a universal dqController that is configured to detect the initial rotor speed during the starting moment and the starting control system is configured to handle motor startup from any initial rotor speed during the starting moment.

Figure 9:
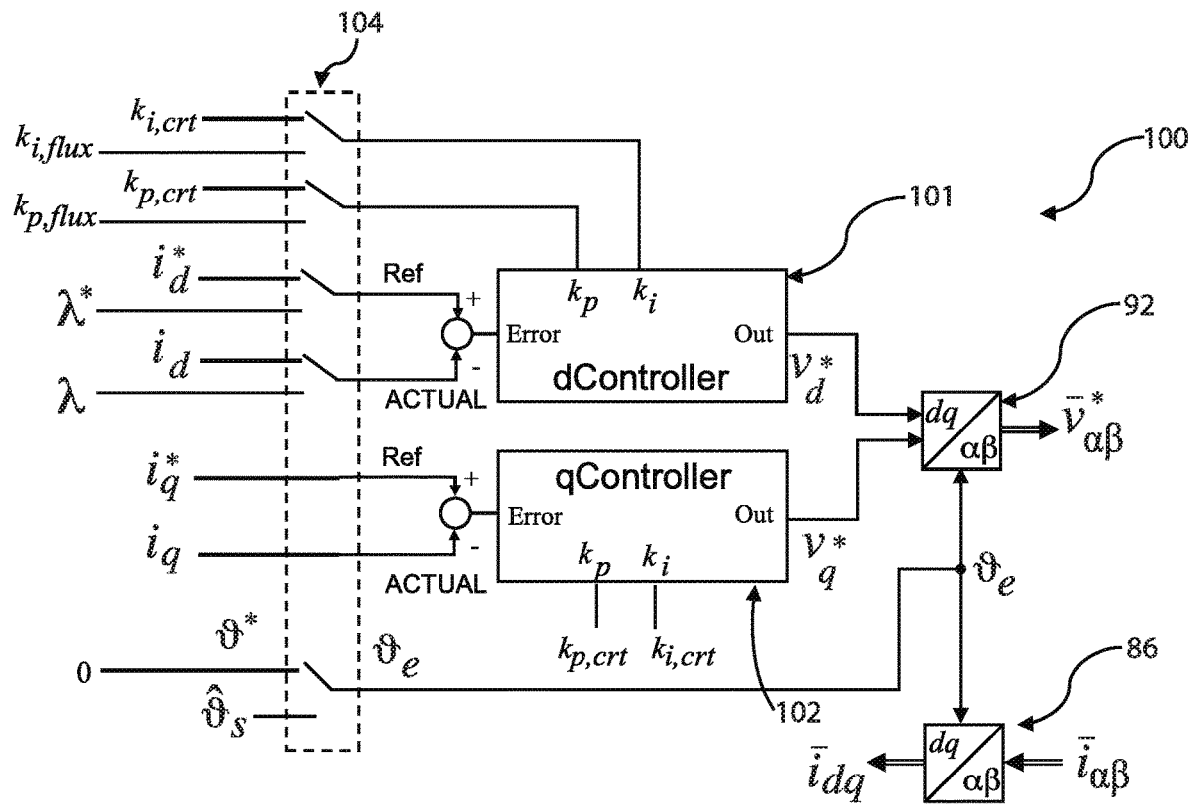
FIG. 9 illustrates one embodiment of a universal dqController for detecting rotor movement, starting motor control, and normal operational motor control.

The motor control functional diagram 60 and the direct flux control functional diagram 80 illustrated in FIGS. 7 and 8 respectively lay out an exemplary logic foundation for motor control and DFC, respectively. FIG. 9 depicts a universal dqController 100 that can implement a detect rotor movement operation during the starting moment of the motor. The universal dqController 100 can be selectively adapted or selectively repurposed to act as dqControllers as part of a DFC scheme or to assist in execution of the detect rotor movement operation during the starting moment. That is, in some embodiments of the present disclosure, the DFC block 62 can be modified as set forth in the DFC functional block diagram 100 such that dController 89 and qController 90 of FIG. 8 can act as universal dqControllers 101, 102 depicted in FIG. 9 that provide feedback, for example back-EMF information to flux observer 67 during the starting moment of the motor for an initial speed estimation before starting motor control begins.

The universal dqControllers 101, 102 can assist in obtaining a speed estimate during the starting moment, and then automatically reconfigure to provide startup control functionality to ramp the motor speed and normal operation control functionality to maintain normal operation at operational speeds. One aspect of the present disclosure relates to providing motor movement information (e.g., estimated motor rotor characteristics, such as estimated motor rotor position and estimated motor rotor speed) to identify the motor running speed status during the starting moment. Below, we discuss the universal dqController role in this feature.

The DFC scheme 80 has two control loops 88 and 89 depicted in FIG. 8. As shown in the adaptation of the DFC scheme 80, the universal dqControllers 101, 102 can be operated either in a current/current control loop configuration or a flux/current control loop configuration. FIG. 9 shows how the inputs to the dqControllers 101, 102 can be selectively changed with switches 104 between different inputs to provide this selective functionality. There are two Proportional-Integral (PI) controllers, the first one is the dController 101 that is a switchable control loop between the current control (id, id*, k$_{p,crt}$, k$_{i,crt}$) and the flux control state (lamda, lamda*, k$_{p,flux}$ and k$_{i,flux}$). The second one is the qController 102 that is only a current control loop. The switches 104 between the flux and current are connected to the dController 101 as shown in 100, FIG. 9. The different possible reference speed states are also connected via switches 104 as shown. The switches can be operated based on the dController 101 status. The status of the switches 104 can be set in response to Movement Detection ON/OFF flag or in response to the values for the reference currents (i*$_d$, i*$_q$) and reference angle v* being set to zero, or in response to another suitable trigger. FIG. 9 shows the dController status changes based on whether the movement detection operation is ON or OFF. When the movement detection flag is on, the dcontroller 101 is configured as a current controller by setting reference currents (i*$_d$, i*$_q$) and reference angle v* to zero.

During the detect motor movement operation, the frame transformation 92 outputs the voltages associated with rotation of the motor rotor. The output of frame transformation 86 represents the rotor movement during the starting moment as indicated by the stator currents (i$_{abc}$) after having been transformed to the stationary frame (α-β) and then to the (d-q) frame of reference. By comparing the stator currents against the zero reference currents, the output dq voltages represent the back-EMF values associated with the wind-run movement of the rotor. Transformation 92 transforms the back-EMF vector to the stationary frame, which the stator flux observer can utilize to estimate stator flux, and in turn various rotor characteristics, such as motor speed, motor angle, and motor position. In alternative embodiments, back-EMF, counter-electromotive force can be detected or measured in a different manner and provided to the flux observer for an initial speed estimation or initial speed categorization. For example, the back-EMF values may not be sufficient to accurately estimate the motor speed, but may be sufficient to categorize the motor speed and select an initial starting speed estimation method, such as by categorizing the initial motor speed according to the categories 141-147 illustrated in connection with FIG. 11. For the HFI-based categories, the speed estimate may not be sufficiently accurate to distinguish among which HFI category the motor speed falls, but the HFI can be performed to obtain a higher accuracy speed estimate and categorization in response to the initial speed estimation using back-EMF.

A conventional DFC configuration can be adapted to a universal dqController configuration. The adapted DFC 100, including the universal dqController 101, 102, can be set to a special status that activates the flux observer, configures certain DFC 100 components in a particular fashion, and does not turn on certain control functions. In general, during the detect rotor movement operation, the d and q Controllers 101, 102 are configured to provide feedback or variables to the flux observer 67 to calculate the rotor speed and rotor position. The DFC does not take control action during the period of time where the detect rotor movement program is being executed. Instead, the DFC circuitry is repurposed, programmed, or otherwise configured to set up the conditions and references such that the flux observer 67 receives the feedback variables and calculates the rotor speed. Some additional embodiments of the universal dqController(s) will now be described in detail.

In one embodiment, back-EMF voltage information is used to derive the starting moment rotor speed. While back-EMF voltage information may not be sufficiently robust to use for estimating rotor speed throughout an entire motor startup routine, back-EMF voltages can provide an initial rotor speed during the starting moment that is sufficiently robust and reliable for selecting an initial startup speed estimation mode to use during the motor startup process. If the rotor is moving at sufficient speed, for example due to wind-run, during the starting moment then the back-EMF voltages can provide a suitable rotor speed estimate and a mode selection can be based on the back-EMF derived speed (e.g., to keep using back-EMF derived speed or to use a flux-based speed estimate). If, instead, the rotor is in a standstill state (i.e., zero speed or a few RPM) or moving slowly (above a few RPM, but too low to accurately derive rotor speed with back-EMF voltages), the back-EMF voltages may not be sufficiently robust and reliable to provide an accurate rotor speed estimate, however, they are sufficient to be indicative that the rotor is moving slowly or in a standstill state, which is sufficient to select use of an appropriate initial speed estimation mode or technique during motor startup control once the programmed detect rotor movement operation during the starting moment is complete.

Where the detect motor speed operation detects a speed value that results in selection of a high frequency injection based speed estimate for the initial startup motor control, the high frequency injection can be enabled during the detect rotor movement operation so that the transition to the startup motor control does not begin until the feedback from the high frequency injection is stable. Further, information from the high frequency injection may further inform initial motor control, such as by recognizing that the rotor is in standstill (as opposed to moving slowly) and therefore implement polarity detection, for example as described in U.S. application Ser. No. 16/795,074, entitled SYSTEM AND METHOD FOR INTERIOR PERMANENT MAGNET SYNCHRONOUS MOTOR CONTROL FROM ZERO OR LOW SPEED, filed on Feb. 19, 2020, to Bojoi et al., which is hereby incorporated by reference in its entirety.

Another embodiment of the present disclosure relates to selective configuration of motor control components between a first configuration for an initial detect rotor movement operation during the starting moment and a second configuration for generating starting and/or operational motor control signals (e.g., direct flux control or field-oriented control). Specifically, motor control system components, such as the controllers in the direct flux control subsystem, can be configured as a universal dqController that provides motor rotor initial movement information to identify the motor running speed status during the starting moment. For example, in one embodiment depicted in FIG. 8, motor control components for startup and normal operational motor control include two proportional-integral ("PI") controllers 89, 90. During normal operation, one controller can be configured as a flux-based dController 89 and one can be configured as a current-based qController 90. The present disclosure provides that the dController 89 can be selectively configured to provide a switchable control loop. For example, in the embodiment shown in FIG. 9, dController 101 can be selectively configured between a flux control state and a current control state by switching the inputs to the PI controller during the detect motor speed operation during the starting moment, as described in more detail below.

Figure 10:
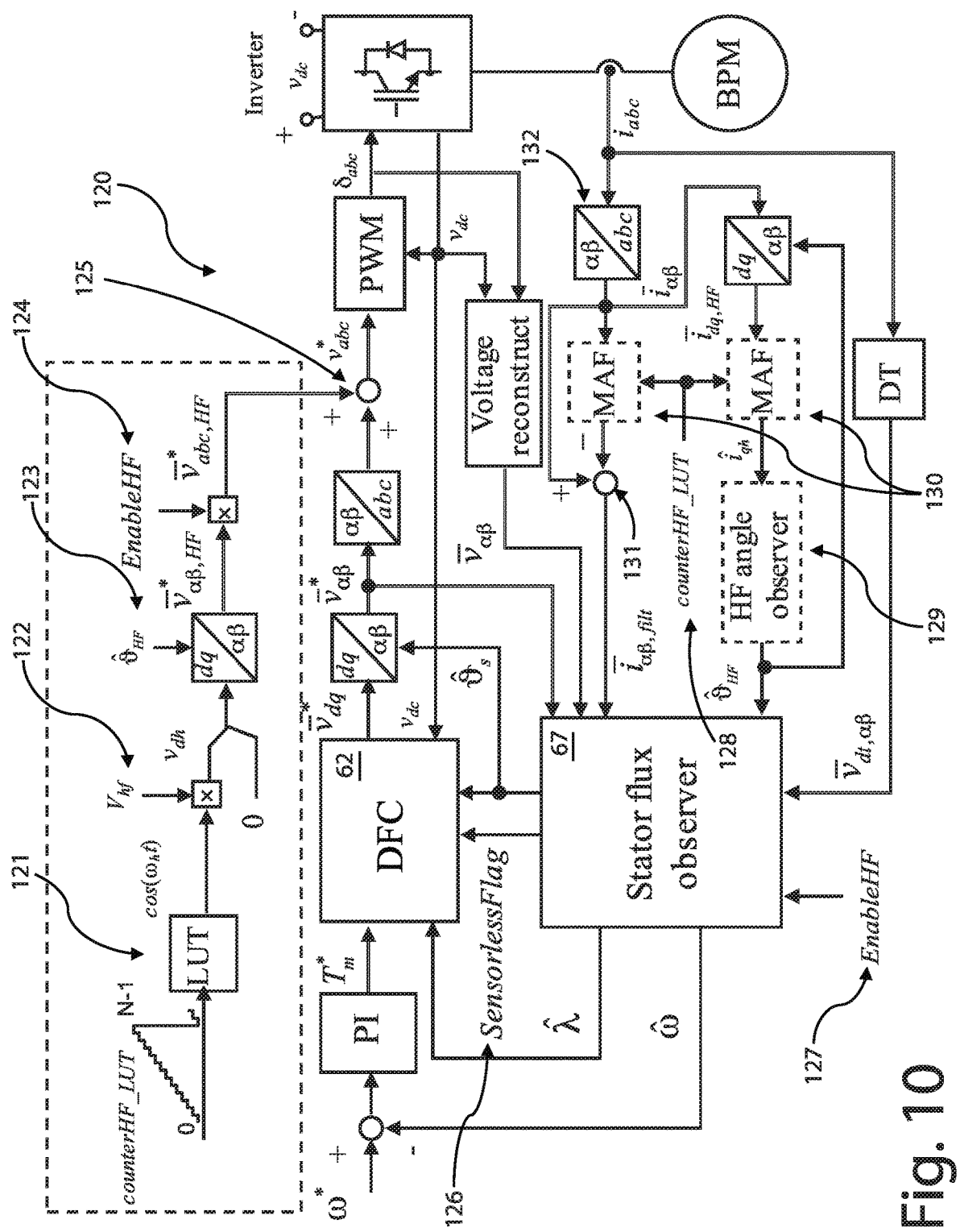
FIG. 10 illustrates a sensorless permanent magnet motor control system diagram including incorporation of functional blocks associated with dynamic high frequency injection.

During the programmed rotor movement detection operation executed during the starting moment, the dController 101 and the qController 102 can be configured as current controllers whose errors are obtained from (d-q) reference stator currents ($i^*_d$, $i^*_q$) and actual stator currents ($i_d$, $i_q$). The actual stator currents ($i_d$, $i_q$) can be obtained by the universal dqController by translation 132 of the stator motor currents $i_{abc}$ into the stationary reference frame $i_{\alpha\beta}$ and further translation 86 to the dq reference frame $i_{dq}$, if necessary. The appropriate current inputs can be passed through various motor controller components to be provided to the DFC or can be routed directly to the DFC. In FIG. 10, the stator motor currents $i_{abc}$ are translated 132 into the stationary reference frame ($i_{\alpha\beta}$) and further translated 86 to the dq reference frame ($i_{dq}$). In the depicted embodiment, the filtered $i_{\alpha\beta,filt}$ is passed through the stator flux observer 67 to the DFC during the detect rotor movement operation, though in alternative embodiments the current could be provided directly to the DFC, or other control block, instead of or in addition to the flux observer. The controllers gains can be set to predefined values associated with the current control state ($k_{p,crt}$, $k_{i,crt}$). The rotor position $D_e$ used for rotational transformation can be set to zero speed. In essence, during the initial detect motor movement process, for less than about one second, the rotor can be assumed to be stationary for the purpose of the initial speed detection ($i^*_d$, $i^*_q$, $v_e$ all set to 0) and instead of using the output of the dqController to instruct the motor, the output of the dqController is utilized to provide feedback for speed detection. In the current embodiment, in this configuration, if the motor is rotating, then the estimated rotor currents ($i_d$, $i_q$) will be non-zero and the output of the dqController will be the motor back-EMF voltages due to the error between the non-zero estimated rotor currents and the reference rotor currents that are set to zero. Specifically, the d and q current controllers can provide back-EMF information in the form of a voltage vector in the stationary frame ($\bar{v}^*_{\alpha\beta}$) to the flux observer. This feedback is shown as the output of the frame translation 92 in DFC 100 in FIG. 9 and the stationary frame voltage vector feedback into the stator flux observer 67 in the system diagram of FIG. 10. Because the flux observer is active during this detect movement operation, it can provide the stator flux components, the positions of the stator flux vector, the rotor position, and the rotor speed value based on the back-EMF voltages provided to the dqController.

Once the rotor movement detection state is activated, the universal dqController is automatically configured into current-current mode and a wait time is implemented for the universal dqController to provide the back-EMF values to the flux observer (or activate HFI) and for the flux observer to have sufficient time to provide a reliable speed value. Initially, the flux observer typically will exhibit an overshoot in connection with its speed estimate. With a small wait time of about 500 milliseconds or shorter, reliable speed information can be available for the system to execute starting motor control strategy. Several examples of the detect rotor movement operation will be described in connection with FIGS. 13-16 later in the disclosure.

Once a stable rotor speed is available from the rotor movement detection operation, the dController can be automatically reconfigured as a flux controller using the gains $k_{p,flux}$ and $k_{i,flux}$, while the input can be switched to the error between the reference and actual stator flux (instead of reference and actual stator currents). In the current embodiment, the position used for all rotational transformation can be configured to either be the estimated stator flux position by the flux observer or the outcome by the HFI process. Going forward, the dqControllers can operate normally.

The dqControllers can be referred to as universal dqControllers due to their ability to provide universal functionality that assists with all of motor startup, from speed detection at the starting moment, through startup control, and normal operation. The configurability of the dqControllers makes them universal because they can execute a programmed detect rotor movement operation in one configuration handle starting and normal operational control in a second configuration. Specifically, due to the wind-run impacts, in order to detect the initial rotor speed at the starting moment, both the dController and qController can be configured as current controllers with zero initial reference speed and zero reference currents. Then, after the rotor movement detection is completed, the dController can be reconfigured or restored to a flux controller, so that the dqControllers can control all further operations, for example including motor control during startup and on through normal operation.

Accordingly, use of a programmed rotor speed detection operation at the starting moment allows the DFC of the motor controller to be reconfigured to provide closed loop rotor characteristic feedback at the starting moment and to assist in selection of which startup speed estimation to use after the rotor movement detection operation is complete (e.g., a flux observer rotor speed estimation or a high frequency injection rotor speed estimation). The selected initial motor startup speed estimation can be used for startup motor control initially.

The time frame of at the starting moment or during the starting moment refers to the time frame when the motor startup sequence begins. Examples of the starting moment time frame are illustrated in FIGS. 13C-16C as the "detect rotor movement" time frame 178, 182, 193, 203. As shown in the examples, the starting moment time frame is typically less than one second and is a period of time where information about the motor is collected so that complete closed loop control, without any open loop control, can be carried out from the moment that control commands are generated after the detect rotor movement operation is complete.

In some embodiments, the starting moment timeframe can refer to the time for the motor to obtain a reliable speed estimate. The detect rotor movement operation may be a set or fixed. In one embodiment, after the detect rotor movement timeframe, the controller is programmed to check whether polarity detection is appropriate, e.g. by checking whether the motor speed is out of the standstill zone. In this case, the detect rotor movement is completed already, but the detection time can cover the polarity detection time window. In other words, without the polarity detection, the rotor movement detection is completed in time, and a control command can be executed, but if polarity detection is appropriate, the movement detection time can be extended to add the polarity detection. Other post detect rotor movement operations can be programmed similarly.

For example, because the controller recognizes the motor is at standstill during the detect rotor movement operation, HFI can be enabled at the tail end of the detect rotor movement to obtain a precise speed estimate based on the response to the HFI. From there, in both FIGS. 13C and 14C, the speed estimate was sufficiently low that polarity detection 179, 183 was used to detect the polarity and therefore direction of travel of the rotor. The polarity detection may or may not be considered part of the detect rotor movement operation. Once the detect rotor movement and polarity detection operations are complete, DFC can begin, just as described above.

V. Dynamic High Frequency Injection

Another aspect of the present disclosure involves activating high frequency injection ("HFI") while the motor is rotating above standstill speeds. That is, one aspect of the present disclosure is directed to application of high frequency injection not only for zero and very low speeds where rotation of the rotor can be ignored, but also for speeds above that (e.g., between 10 RPM and 200 RPM). The application of high frequency injection and handling of the stator current response within the context of a rotating motor rotor is referred to as dynamic high frequency injection ("DHFI"). Ordinarily, the control signal processing associated with the HFI response is digitized. If the HFI is not removed before the signals are processed by the flux observer, the estimated results will be affected by the HFI, which in turn can affect the control system response and integrity of the output control signals.

DHFI addresses this issue by decoupling the HFI signal from the stator response before it can be analyzed by the flux observer. In essence, by filtering the stator response currents in a first suitable manner, the response to the high frequency signal injection can be decoupled from the response associated with the rotor movement. That is, the high frequency response can be isolated from the stator current changes associated with rotation of the rotor. Further, by filtering the stator response currents in a second suitable manner, the high frequency signal can be filtered away from the fundamental current feedback for the stator flux observer to avoid interruption of the motor control, as shown in FIG. 10.

Speed can also be above standstill, but still rather low. That is, the speed can fall between a value above standstill threshold and a closed loop speed threshold, such as speed value $S_1$ shown in FIG. 6, such as $|\omega_1|<\omega<|\omega_2|$. After starting moment and the detect rotor movement is complete, the HFI method can be applied to provide a robust position and speed estimation for closed loop control. Once the speed reaches above the $\omega>|\omega_2|$ threshold, the HFI can be turned off and a closed loop observer mode can be utilized. That is, the DFC will step in the closed loop control by using the estimated speed and position from the flux observer.

Several embodiments of an HFI system and method are disclosed in U.S. application Ser. No. 16/795,074, filed on Feb. 19, 2020, by Bojoi et al. entitled "SYSTEM AND METHOD FOR INTERIOR PERMANENT MAGNET SYNCHRONOUS MOTOR CONTROL FROM ZERO OR LOW SPEED", which was previously incorporated by reference in its entirety. This HFI method can be adapted or implemented in conjunction with the dynamic high frequency injection ("DHFI") embodiments described herein. That is, in addition to the enabling HFI in the standstill speed zone, the robust starting process can include enabling HFI when the rotor is moving within a low speed range to estimate the rotor position and speed. Below, details regarding various embodiments of this implementation and strategies relating to same are disclosed in connection with a comprehensive system and method that incorporates these, and other, aspects.

Figure 11:
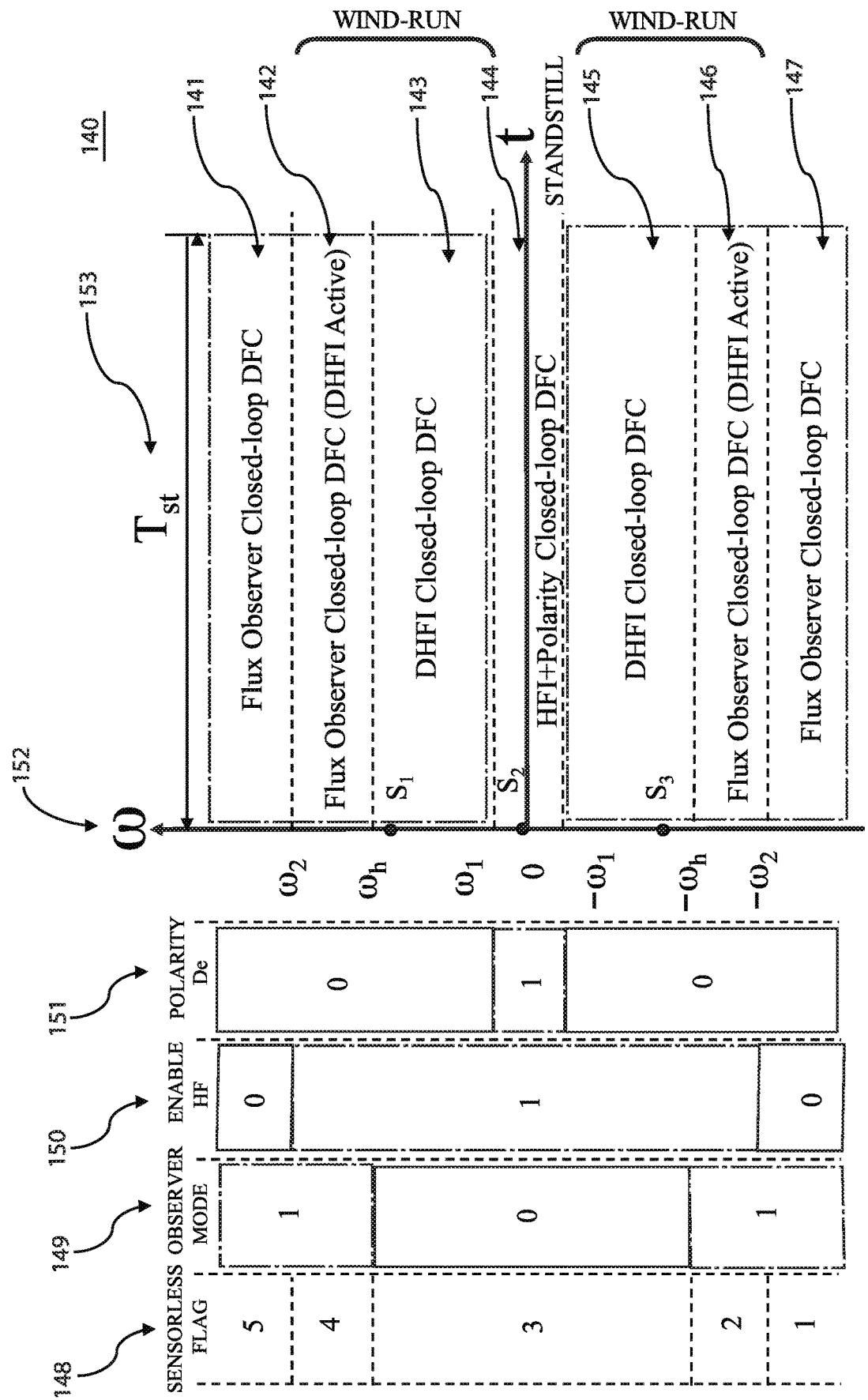
FIG. 11 illustrates one embodiment of starting modes for startup motor control of a sensorless permanent magnet motor.

In one embodiment, perhaps as best described in connection with FIG. 11, the universal control operates differently based on the estimated motor rotor speed. In particular, the different modes of operation in one exemplary embodiment can be described as follows:

HFI+Polarity Detection Closed-loop DFC. At zero or very low (e.g., a few RPM) startup speeds, such as startup speed $S_2$ shown in FIGS. 5 and 11, where the estimated rotor speed ω falls within a speed range 144 that is less than the absolute value of a first rotor speed threshold ($\omega<|\omega_1|$), the HFI method with polarity detection can be used to augment the detect rotor movement operation, i.e. in one embodiment, supplement or augment the speed estimate based on back-EMF. This can include application and integration of the high frequency injection and polarity detection. Activation of the HFI and polarity detection enables estimation of certain parameters that can be utilized by motor control system, as discussed in connection with FIG. 10. For example, the HFI method can provide access to robust HFI position estimates, speed estimates, and other motor characteristic estimates. These can include parameters related to rotor angle estimation, polarity, or the motor's response to high frequency injection generally, or any combination thereof, which can be provided to the DFC or used elsewhere in the motor control system. This can also be referred to as HFI-DFC+Polarity. The decoupling components associated with DHFI can be, but need not be, enabled in connection with this use of HFI.

DHFI Closed-loop DFC. At low speeds between the absolute value of the first threshold and the absolute value of the second speed threshold ($|\omega_1|<\omega<|\omega_h|$), such as startup speed $S_1$ or $S_3$, as shown in FIGS. 5 and 11, where the estimated rotor speed ω falls within speed ranges 143, 145. As a practical example, between 5 RPM and 200 RPM and between −5 RPM and −200 RPM. At these speeds HFI cannot be enabled reliably without also activating the decoupling functionality of DHFI so that the high frequency signal does not interfere or interrupt the control loop. At these speeds, the motor control utilizes the speed estimate provided as a result of the high frequency injection and the control system also relies on the decoupled or filtered stator current associated with the movement of the rotor.

Flux Observer Closed-loop DFC (DHFI Active). Once the estimated speed reaches or exceeds the absolute value of the speed threshold ($\omega>|\omega_h|$), as shown in FIG. 11, the estimated speed and position from the flux observer can be used to carry out the closed loop DFC instead of using the DHFI estimated speed and position. For a range of speeds proximal to the flux observer transition threshold $\omega_h$, the high frequency injection can remain enabled so that the HFI based speed estimates are available until the motor speeds increase to a point, e.g., at least $\omega_2$, where the system is confident they will not typically fall below the flux observer transition threshold $\omega_h$. As a practical example, $\omega_h$ can correspond to about 200 RPM or −200 RPM and $\omega_2$ can correspond to about 250 RPM or −250 RPM.

It should be understood that the various thresholds provided are merely exemplary. Further, the thresholds are provided in terms of speed and the units of RPM, but the thresholds may also be provided using different units or using a different rotor characteristic, such as a different rotor characteristic that is correlated with speed. Further, the values corresponding to the category limits can be inclusive or exclusive depending on the application and how the motor control process is programmed.

Since the HFI method is not only applied into the zero speed, but also for the low speed range to secure the position and speed estimate precision, the closed loop control based on the DFC is realized in a large portion or all of the practical starting speed range. The HFI method that is applied into a rotating motor rotor situation can be referred to as a dynamic high frequency injection ("DHFI") method.

In essence, DHFI involves the application of high frequency injection techniques into a motor control system, such as a direct flux control system, during motor rotating situations where ordinarily HFI would not be utilized. Thus, the high frequency signal is injected into a moving waveform with a fundamental frequency of a controlled variable.

The control scheme diagram 120 of FIG. 10 shows a control system including a HFI portion 121-125 and a HFI decoupling portion 128-131. A description of the DHFI system and method as well as its integration into the exemplary motor control system with DFC as shown in FIG. 7, will now be described. Referring now to FIG. 10, the control diagram 120 illustrates one embodiment of direct flux control of the present disclosure that incorporates the high frequency injection and polarity detection described in U.S. application Ser. No. 16/795,074, filed on Feb. 19, 2020, by Bojoi et al. entitled "SYSTEM AND METHOD FOR INTERIOR PERMANENT MAGNET SYNCHRONOUS MOTOR CONTROL FROM ZERO OR LOW SPEED", which was previously incorporated by reference in its entirety. The high frequency injection can be integrated with the motor control system of FIG. 7 by utilizing a pulsating voltage vector counter to generate a sinusoidal waveform through a Look-Up-Table (LUT) 121. A high frequency voltage waveform 122 can be generated according to a selected voltage amplitude, which can be utilized in connection with the high frequency rotor angle to transform the high frequency voltage waveform into a voltage vector $\bar{v}^*_{\alpha\beta,HF}$ in the stationary reference frame 123. Then, in response to an EnableHF flag or other suitable trigger, 124, the output voltage vector $\bar{v}^*_{abc,HF}$ for high frequency injection is produced and injected into the DFC control system 125.

Incorporation of DHFI into the control system can also include a flag or other communication as input to the stator flux observer, for example in the form of a flag, such as an EnableHF flag 127. The EnableHF flag 127 can provide an indication to the stator flux observer that the high frequency injection has begun or is going to begin. This enables the stator flux observer to react accordingly. For example, the stator flux observer can dynamically change its output depending on whether the EnableHF flag is thrown or not, as discussed in more detail below. In some embodiments, the stator flux observer can delay its output to give time for any decoupling functionality to propagate through the system and the filtered stator currents to reach the stator flux observer.

Separating or decoupling the portion of the stator current response due to the high frequency injection signal and the portion of the stator current response due to movement of the rotor from the stator current response enables DHFI functionality. In some embodiments the decoupling can be achieved through filtering. For example, a band pass filter 130 can be utilized to decouple the portion of the stator current response associated with the high frequency injection signal based on the couterHF_LUT signal 128 or another characteristic of the high frequency injection. In the current embodiment, one of the band pass filters 130 filters the stationary frame stator response current and the other filters the dq frame stator response current. The fundamental waveform observer of the current embodiment expects a stator response current in the stationary frame while for the DHFI, the high frequency observer expects the high frequency portion of the quadrature current $i_{qh}$ from the dq frame.

The summation junction 131 is used to subtract the filtered high frequency portion of the stationary frame stator response current from the full stator response current in the stationary frame, yielding the portion of the stator response current that does not correspond to the high frequency injection. The plus and minus symbols at the summation junction 131 represent that the output of the filter 130 is subtracted from the stator response current. In essence, this subtraction makes the band pass filter into a band stop filter that filters out the response to the high frequency injection from the rest of the stator response current. The remaining stator response current with the high frequency response portion subtracted reflects the response to the rotor movement or the fundamental waveform and is suitable for use by the flux observer and the direct flux control, despite the high frequency injection, which otherwise could create issues.

Put another way, when a high frequency signal is injected into the system voltage at junction 125, the motor system can react to the injection in the response currents, $i_{abc}$, 132. The response or reaction current high frequency signal can be decoupled from the moving waveform and input to the high frequency angle observer 129 to estimate the position and speed as set forth in U.S. application Ser. No. 16/795,074, entitled SYSTEM AND METHOD FOR INTERIOR PERMANENT MAGNET SYNCHRONOUS MOTOR CONTROL FROM ZERO OR LOW SPEED, filed on Feb. 19, 2020, to Bojoi et al., which was previously incorporated by reference in its entirety. The response or reaction high frequency current signal can be also separately be filtered away from the fundamental current feedback for the stator flux observer 67, in FIG. 7 to avoid interruption of the HFI operation.

In one embodiment, the decoupling can be accomplished with two identical Moving Average Filters (MAF) 130 designed for the DHFI method. One of the MAFs is configured as a band pass filter that only allow the high frequency signal to pass and removes the response to the excitation signal or fundamental moving waveform from the signal. Where the input is the stator response in the dq frame, the output of the filter 130 is the feedback high frequency q-axis current for input to the high frequency observer 129. The high frequency observer can generate the position and speed estimates at low speeds (e.g., less than 500 RPM, and typically at speeds less than 200 RPM) using this filtered response current. The other filter is configured as a band stop filter by virtue of subtracting the output of the filter with the original signal, represented by the summation junction with the output of the filter being subtracted from the stationary frame stator response current. In this way, the MAF acts as a band-stop filter that is designed to remove the high frequency signal from the fundamental waveform, as shown in the combination of 130, 131. The output of the band-stop filter can be input as the current feedback for the stator flux observer 67 and provided to the DFC, a functionality typically not available or unreliable during high frequency injection. In alternative embodiments, a different configuration of filters can be utilized to decouple the response to the high frequency signal and the response to the excitation signal for rotor movement. For example, although the current embodiment uses two identical filters, in alternative embodiments different filters can be utilized to obtain suitable filtered signals. Further, in some embodiments, a band stop filter can be utilized instead of a band pass filter and junction to subtract the output from the original signal. Essentially any selection of components and configuration of those components can be utilized that provides the appropriate filtered signals expected by the control blocks, such as observers and DFC blocks, to provide effective DHFI.

In FIG. 10, a technique that successfully acquires precise position and speed information to ensure DFC functionality at a decently low speed range, e.g., $|\omega_1|<\omega<|\omega_h|$, is introduced. Instead of injecting a high frequency signal into a rotor at zero speed or standstill status, such as the well-known HFI method, DHFI involves extending the HFI to application into rotating rotor, typically thought not to be useful due to fluctuating stator response currents present when the rotor is moving. That is, whenever the rotor moves, there are real-time varying voltage and current waveform or moving waveforms on the lines. Similar to the power line communication technique, a high frequency signal can be injected on top of a moving waveform of command voltage 124, 125 in motor control process, then the stator response signals from the HFI injection can be processed in order to obtain speed and position data based on the command voltage moving waveform as the signal carrier. Furthermore, after the HFI signals are downloaded to process for position and speed estimates, the system can filter out the high frequency signal to maintain the cleanliness of the moving waveform 130. This process that first injects the high frequency signals and acquires the position and speed data, and then filters out the high frequency signals from the moving waveform, can be referred to as dynamic high frequency injection.

In one embodiment in accordance with the DHFI method of the present disclosure, the motor controller can utilize a high frequency injection at zero speed or standstill zone as well as at a decently low speed range and a stator flux observer at higher speeds to obtain reliable speed estimations for closed-loop control throughout the entire startup procedure. In some embodiments, the high frequency injection rotor characteristic detection method is integrated into a direct flux control method until the flux observer can generate stable estimated speed signals for the closed loop control. This process includes high frequency injection into the DFC system and decoupling the high frequency injection away from the system after the HFI estimated speed signal is obtained. That is, the HFI waveform can be added into the sinusoidal voltage waveform during motor startup at certain speeds. High frequency injection enables acquisition of a reliable signal that can be used for motor speed estimation, even while the motor is at low speeds. Then, once the high frequency injection has been utilized to obtain the signal for estimating motor speed, the HFI waveform can be filtered out from the sensed motor signals that are provided to the direct flux control, for example with a pair of moving average filters (MAF). Of particular significance is that this HFI waveform can be filtered out from the sensed motor signals in real-time as the rotor is rotating, which can be referred to as dynamic high frequency injection ("DHFI"). The ability to dynamically decouple the HFI while the rotor is moving provides the ability for the motor control system to use high frequency injection-based techniques simultaneously with other techniques that otherwise could not be executed due to the high frequency signals being present on the sensed stator response signals.

In some embodiments, the HFI can be deactivated once the HFI estimated speed reaches or exceeds the speed threshold $\omega_h$. In other embodiments, the HFI remains active even after the HFI estimated speed reaches or exceeds the high speed threshold $\omega_h$, but the DFC switches observer modes, for example to utilize the stator flux observer speed estimate. In this way, the DHFI can remain active to provide access to robust HFI based position and speed estimations for the DFC not only until the speed reaches the high speed threshold $|\omega_h|$, but also during any speeds during closed loop control 21, 23 in FIG. 5 until the estimated speed is above the absolute value of the second speed threshold ($\omega > |\omega_2|$).

DHFI functionality, specifically the ability to decouple the response due to the rotor movement signal from the stator current response that also includes the response to the high frequency injection, enables closed loop DFC operation with an accurate speed estimate. That is, without the decoupling provided by DHFI, the speed estimate provided to the DFC would be unreliable. While DHFI functionality can allow a smoother, more robust transition throughout motor startup, it can also provide the ability to purposely and intentionally operate at a low speed range for a period of time, such as greater than 10-15 seconds, during the startup process. The ability to maintain low speeds during startup for a period of 10 seconds or more with accurate speed estimation throughout can be useful for certain sensing and protection features in the upper system level of an HVAC product. The ability to operate in closed loop DFC at such a low Rpm value for an extended period of time, such as greater than 10 seconds, is not feasible without DHFI. However, with DHFI, the controller can be programmed to intentionally hold the speed at a rate above standstill, such as between 20-60 Rpm or 30-50 Rpm, for a predetermined amount of time, such as 10 seconds, or until another trigger is provided to the controller.

VI. Starting Strategies and Procedures (A) System Preparation for Starting

At motor startup, for example, including the time leading up to startup as well as right before and at or during the startup moment, appropriate preparation and care should be taken for computation of current offsets and charging of bootstrap capacitors. Current offsets should be calculated with all insulated-gate bipolar transistors ("IGBTs") off (this typically includes disabling pulse-width modulation ("PWM"). Then, bootstrap capacitors should be loaded, for example, using high phase duty-cycles (i.e., low conduction times for the low side IGBTs).

(B) Universal dqControllers for Detection of Rotor Movement

Determining rotor speed at or during the starting moment of the motor is one aspect of motor control incorporated into some embodiments of the present disclosure. As mentioned herein, the flux observer can handle motor speed detection and position detection utilizing an embodiment of the universal dqController of the present disclosure. At the starting moment, the system initializes certain parameters and obtains initial speed information based on the stator current values natural response to ongoing rotor movement, before any active control or associated feedback has a chance to propagate through the system. That is, the detect rotor movement operation is not a motor control loop, it is a programmed pre-control operation. Accordingly, before the control loop begins, the control system can quickly activate the flux observer to acquire the speed information, for example in the form of back-EMF information available during the detect rotor movement operation due to rotation of the rotor from wind-run, as opposed to excitation from driving the stator currents with the inverter.

As shown in the functional block diagram 100 of FIG. 9, during this state, the motor can be operated by using a current control configuration implemented in the stationary ($\alpha$-$\beta$) reference frame $v_e = 0$, see FIG. 9. The dController and the qController are operated as current controllers having zero reference current at the input, $i^*_d, i^*_q = 0$. Unlike during startup and normal operation, the controllers do not provide command or reference voltages for controlling the motor. Instead, in one embodiment, the dqController provides their output in the form of back-EMF voltages to the flux observer. for example, if the motor is rotating, then the outputs of the dqControllers are the motor back-EMF voltages. As the flux observer is active, it provides the stator flux components, the positions of the stator flux vector, the rotor position, and the rotor speed value.

In this embodiment with this configuration, once this state is activated, a wait time for the flux observer to provide a reliable speed value can be used since at the beginning the speed estimate will typically overshoot. The waiting time could be about 0.5 second or even shorter time. After the waiting time, a reliable speed information is ready for the system to execute the starting strategy and process.

(C) Starting Control Strategy and Procedure

With reference to the exemplary speed zones depicted in FIGS. 5 and 11 as well as the control parameters depicted in FIG. 11, a comprehensive motor starting control strategy and process will now be described in detail. One exemplary embodiment of a starting control strategy can be executed via multiple flags that can be set and cleared to provide real-time or near real-time control.

(1) Introduction of Speed $\omega_h$

FIG. 5 shows a graph of motor speed (y-axis) over time (x-axis). A number of different threshold speed values are illustrated in both FIG. 5 and FIG. 11. FIG. 11 also includes a high-speed threshold, $\omega_h$ and $-\omega_h$, depending on the rotation of travel. The threshold may only be configured for one direction or may be configured for bi-rotation and although the thresholds are depicted as equal in both directions, that need not necessarily be the case. Further, throughout this disclosure reference may be made to this and other speed values without reference to the direction or sign, it should be understood as such that this and other speed thresholds may be referred to by their absolute value $|\omega_h|$, even where the absolute value symbol is not used. This speed threshold is a threshold at which the motor control system is configured to activate the flux observer for sensorless control as shown in FIG. 11. As the estimated rotor speed reaches and exceeds the threshold speed $\omega>|\omega_h|$, the motor control system is configured to change the SensorlessFlag state and update the ObserverMode as well. For example, the high-speed threshold c can be 200 RPM and the flux observer speed threshold $\omega_2$ may be 250 Rpm. The flux observer speed threshold can be a speed where the flux observer should be able to consistently provide an accurate rotor speed estimate for use in the control system. The introduction of a threshold high speed c below (or above for $-\omega_h$) the threshold speed $\omega_2$, where the DHFI is turned off. The gap in speeds between the threshold high speed $\omega_h$ and the flux observer threshold speed $\omega_2$ can be configured depending on the application, such as the ramp-up rate of the starting motor control or other factors, either alone or in combination.

Furthermore, another consideration for selecting a speed gap between the speed threshold $\omega_h$ and the DHFI turned-off threshold speed $\omega_2$ is that the speed may recede to a lower speed after reaching the flux observer threshold speed $\omega_2$. The motor startup control system can be configured to maintain two or more speed estimate resources simultaneously for a speed range or window to secure a smooth transition from a first speed estimation process to a second speed estimation process.

(2) Introduction of Flags

Some embodiments of the control system of the present disclosure can be configured to operate based on one or more flags that control the logic or state of the control system. Exemplary flags configured for use in one embodiment will now be described in detail with reference to FIG. 11.

(a) SensorlessFlag. The control system can be configured to estimate motor rotor speed according to a particular speed estimation method. That method can be dynamically updated based on changes to the SensorlessFlag so that future speed estimates are determined utilizing the speed estimation method associated with the latest SensorlessFlag value. That is, the rotor speed estimate will fall somewhere on the rotor speed scale 152 with the various speed thresholds and the sensorless flag will be updated accordingly. Each SensorlessFlag value is associated with a particular speed zone or set of speed zones 141-147 and is associated with a particular speed estimation method and configuration. In some embodiments, a speed zone may be associated with multiple speed estimation methods and configurations that are capable of being executed in parallel or series.

In some embodiments, as the estimated motor speed approaches operational speed levels, multiple closed loop speed estimations can be executed in parallel, such as a speed estimation by a stator flux observer and a speed estimation by high frequency injection. The startup method can include selecting an appropriate speed. The selection can be based on a set of criteria, such as selection of one of the two estimated speeds based on pre-defined criteria, for example if the flux observer detects a speed above a threshold speed then the flux observer speed is deemed reliable and utilized and otherwise the HFI speed is selected for startup motor control. Alternatively, selection of the estimated speed can involve application of one or more statistical functions based on one or more of the different estimated speeds output by the parallel speed estimations to select an appropriate rotor speed estimation during the transition period. The selection process may include criteria for selecting which of the two or more parallel speed estimations are more reliable and selecting that speed estimation, or the selection process may include criteria for interpolating or otherwise defining a speed estimation based on two or more parallel speed estimations. In some embodiments, the parallel speed estimations are not conditioned, but instead performed in the normal course of the motor control loop, but only referenced if the appropriate circumstances arrive. In other embodiments, the speed estimations are performed sequentially instead of in parallel.

Further, where multiple speed estimation methods/configurations are associated with a speed zone, a default method/configuration may be associated, or a logical statement may determine the speed estimate configuration and method. In the embodiment depicted in FIG. 11, there are five SensorlessFlag states 148, which are listed below.

SensorlessFlag=1: Speed range, $\omega \leq -\omega_2$, in FIG. 11, 147, DFC based on internal flux observer rotor speed and rotor position; DHFI deactivated;

SensorlessFlag=2: Speed range, $-\omega_2<\omega \leq -\omega_h$, in FIG. 11, 146, DFC based on internal flux observer rotor speed and rotor position, DHFI activated;

SensorlessFlag=3: Speed range, $-\omega_h<\omega<\omega_h$, in FIG. 11, 143, 144, 145, DHFI activated (DFC based on HF angle observer 129); DFC based on HF angle observer 129 plus polarity detection at $-\omega_1<\omega<\omega_1$;

SensorlessFlag=4: Speed range, $\omega_h \leq \omega<\omega_2$, in FIG. 11, 142, DFC based on internal flux observer rotor speed and rotor position; DHFI activated;

SensorlessFlag=5: Speed range, $\omega>\omega_2$, in FIG. 11, 141 DFC based on internal flux observer rotor speed and rotor position; DHFI deactivated;

The SensorlessFlag incremental numbers are also the speed ramp-up control sequence. Any initial speed at the starting moment can be controlled to accelerate up to the normal DFC operation through the SensorlessFlag=5 from any SensorlessFlag number at starting moment. For example, if the SensorlessFalg number is 2, the control sequence is 2, 3, 4 and 5.

(b) ObserverMode.

In the current embodiment, the ObserverMode flag has two states: ObserverMode=0 and ObserverMode=1.

In ObserverMode=0: In this mode the stator flux observer is generally configured to utilize output from the HFI angle observer 129 (see FIG. 10) for determining rotor speed and rotor position according to a rotor magnetic model. That is, the stator current response to the high frequency injection can be fed to a HFI angle observer 129, which can determine rotor speed and rotor position. Although the HF angle observer 129 is illustrated as a separate functional block, it can also be integrated with a stator flux observer such that sub-block of the stator flux observer can handle speed estimation depending on whether a high frequency stator current response is provided or a normal stator current response is provided to the observer. In this embodiment, the ObserverMode=0 and SensorlessFlag=3 coincide (i.e., the estimated speed is below the speed threshold, $-\omega_h<\omega<\omega_h$).

In ObserverMode=1: In this mode, the stator flux observer does not use the HFI observed position angle. Instead, the flux observer estimates the rotor position and rotor speed internally. This mode corresponds to SensorlessFlag=1, 2 and 4, 5 where the rotor position and speed are estimated by the flux observer. DHFI is still enabled until the rotor speed estimate exceeds the flux observer threshold $\omega_2$, after that, the DHFI is turned off because the control system (1) has provided sufficient lead time for the flux observer to stabilize; and (2) the rotor speed is sufficiently high that the rotor speed is unlikely to dip below the rotor speed where the internal flux observer estimate may be unreliable and an HFI-based speed estimate may be more suitable.

(c) EnableHF. The EnableHF flag has two states in the current embodiment.

In EnableHF=0: HFI operation is disabled. The HFI observed position is set to the rotor position that is provided by the flux observer except when the rotor polarity detection is activated.

In EnableHF=1: HFI operation is enabled. The high frequency signal is injected from the HFI 125 into the motor control system. The HFI allows the control system to more accurately estimate rotor position and rotor speed. Further, the stator flux observer receives the flag and utilizes the HF angle observer 129 in order to provide the output rotor position and rotor speed.

(d) Polarity Detection. The polarity detection flag has two states.

In PolarityDe=0, HFI operation is disabled when the speed is $\omega > |\omega_1|$, out of speed range 144. While in PolarityDe=1, HFI operation is enabled where rotor speed is within speed range 144 ($-\omega_1 \leq \omega \leq \omega_1$).

Table 1, below, shows how the direct flux control of one embodiment of a motor control system operates in different states of closed loop control

TABLE 1

| Control variables and statuses list. | | | | | |
|---|---|---|---|---|---|
| States | Speed ω | SensorlessFlag | ObserverMode | EnableHF | PolarityDe |
| 1 | $\omega \leq -\omega_2$ | 1 | 1 | 0 | 0 |
| 2 | $-\omega_2 < \omega \leq -\omega_h$ | 2 | 1 | 1 | 0 |
| 3 | $-\omega_h < \omega < \omega_h$ | 3 | 0 | 1 | 0 |
| 4 | $-\omega_1 \leq \omega \leq \omega_1$ | 3 | 0 | 1 | 1 |
| 5 | $\omega_h \leq \omega < \omega_2$ | 4 | 1 | 1 | 0 |
| 6 | $\omega \geq \omega_2$ | 5 | 1 | 0 | 0 |

(3) Method for Motor Control Startup and Operation

Figure 12:
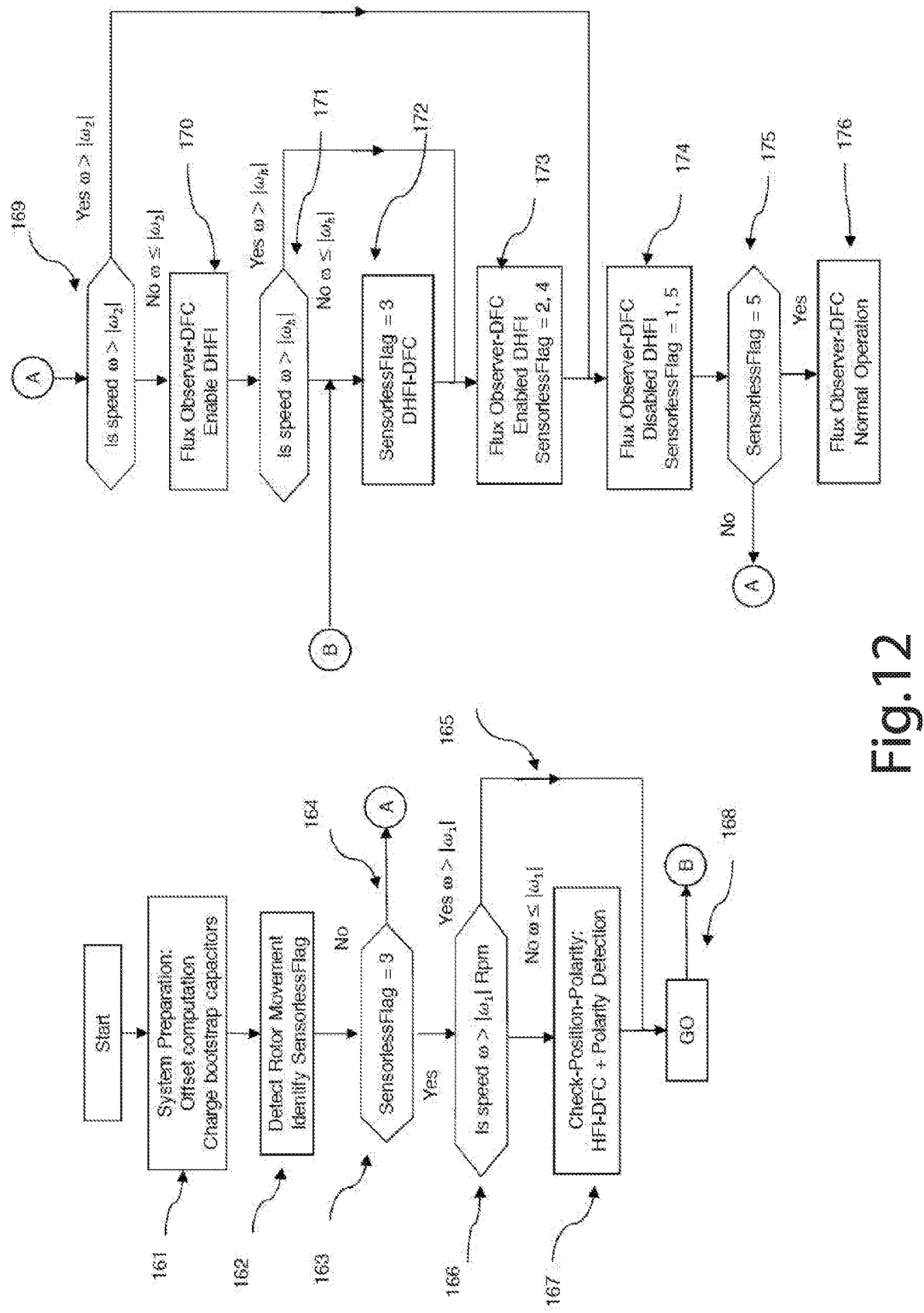
FIG. 12 illustrates a logic flow chart showing an embodiment of a method of motor startup control including speed thresholds for changing operational status.

FIG. 12 illustrates a flowchart 160 of exemplary embodiments of methods for universal motor control of a permanent magnet synchronous motor including detecting rotor movement, starting motor control through normal operation motor control. The motor control, where present, can be performed entirely with closed loop control. These embodiments are particularly suited for use in commercial fan and blower applications or any other application where the motor rotor may experience wind-run or other forces that make initial motor startup conditions unknown or unreliable. The flowcharts will now be described in detail.

In response to a starting command or other start trigger, the electronic motor controller can be configured into an initialization state or motor start preparation stage 161. Typical actions during this state can include computation of offsets and charging of bootstrap capacitors, among other motor initialization actions.

After initialization and at the starting moment, the motor control system enters a detect rotor movement state 162. As discussed earlier in the disclosure, during this state the motor controller can be configured to carry out a rotor movement detection, which can include a rotor speed estimation according to a predefined rotor speed estimation method. This rotor movement detection process can involve setting various flags for startup closed loop control based on that initial rotor speed estimate. In general, the motor controller can reliably detect the initial rotor speed down to about 5 RPM. With an initial rotor speed estimate, the control flags can be set accordingly thereby configuring the control system for startup control.

Specifically, at the end of the detect rotor movement state, the SensorlessFlag can be checked and the motor control can be directed depending on the SensorlessFlag.

If SensorlessFlag is not three 164, the control system goes to the A, 169 to skip the process of the zero speed and standstill starting steps.

If SensorlessFlag is three 163, where the rotor speed estimate is below the absolute value of the speed threshold $\omega \leq |\omega_h|$, then the EnableHF flag is set to one, which will or has triggered the motor control system to activate the high frequency injection circuit and inject the high frequency signal into the control system. From there, the initial (i.e., starting moment) HFI observed angle is received and utilized (e.g., passed through to the DFC) by the stator flux observer. The control system then checks whether the estimated rotor speed is lower than the polarity speed threshold $\omega_1$ 166 by checking if the polarity detection state is PolarityDe=1. If it is, then the control system executes a check position-polarity action 167 by triggering the application of two voltage pulses to identify the polarity of the rotor 167. During the voltage pulses, the HF injection is disabled, but the rotor position experiences practically no change because the polarity detection is fast, and the rotor is moving at a very slow speed. After the rotor polarity check, the HF injection is engaged again, and DHFI based DFC closed loop control carries out the initial starting speed control by virtue of the GO state being called, 168, which allows the control system to enter the starting process at B, associated with DHFI-DFC.

If the estimated speed is greater than polarity speed threshold $\omega_1$ 165, there is no need to conduct the polarity detection, thus the system control goes to the GO state, 168 at B. At the B receiving state, the system checks the SensorlessFlag=3 at 172, and takes the DHFI position and speed output to feed the DFC closed loop control until arriving at the state 173.

The system checks the speed 169 at A. If the speed is $\omega > |\omega_2|$, DFC Control with a flux observer estimation is utilized, 174 without the DHFI. If the speed is $\omega \leq |\omega_2|$, the system checks whether the speed is $\omega > |\omega_h|$, 171, for example, 200 Rpm. If the absolute speed value is lower than $\omega_h$, the system takes the DHFI output to feed the flux observer, no longer to use the internal flux observer result. The system is in closed loop DFC with the DHFI output across the speed range $\omega \leq |\omega_h|$, 173. However, the control system does not need to conduct Polarity detection even though it may pass through the zero speed to the positive rotating direction in a negative starting speed case.

In the state 171, if $\omega > |\omega_h|$, the flux observer uses its internal position and speed to conduct the DFC until the speed reaches $\omega > |\omega_2|$, 173. In the state 174, the DHFI operation is disabled after speed absolute value is ω>|ω₂|, (for example, above 250 Rpm). If SensorlessFlag=1, at 175 the rotor is in the negative rotating direction, the system goes down toward to the positive one passing through the zero-speed zone, thus going to the state 169 at A. If SensorlessFlag=5, at 175 the DFC closed loop control goes through the starting process into the normal DFC operation at the state 176.

The method works at both positive and negative speeds and allows also the motor deceleration down to zero speed without any problems. For absolute speeds higher than |ω₂| (250 Rpm), the flux observer works well.

Application of the decoupling prevents the DHFI components from impacting the DFC system. Proper filtering of the currents and selection of voltage commands can secure the observer decoupling by removing the DHFI components from the signal. The filters in the current embodiment are Moving Average Filters (MAV) 130. In alternative embodiments, different filters can be utilized to decouple the HFI component. For example, the injected frequency from 500 Hz to 800 Hz can provide sufficient bandwidth.

VII. Experimental and Simulation Results

Embodiments of the present disclosure including the control system and can be implemented into commercial fan systems. Effective results have been achieved in both simulation and testing. Some of the results are presented to illustrate details about how the system starts from different statuses and changes speed to reach a final destination speed.

Before turning to the experimental and simulation results, it is worth noting that the motor control system 60 startup procedure is robust and can be implemented free from any gaps in closed loop control that are common in conventional PMSM control systems. That is, embodiments of the present disclosure are capable of operating entirely without open loop control. Open loop control for a PMSM refers to a control system that outputs commands that alter operation of the motor, but lacks a feedback loop and therefore the open loop control system's output, e.g., voltage vectors, torque commands, or other signals that influence control of the motor, are unaffected by the resultant changes to the motor brought about by the output, such as changes in (or lack of changes in) rotor speed and position or other motor characteristics. Open loop control can be especially problematic in certain motor applications, such as commercial fan and blower applications, where the initial rotor speed and position are unknown or unreliable, e.g., due to wind. That is, open loop startup control of a PMSM will either assume the PMSM is at standstill or issue commands to a braking system with hopes, but no ability to verify, that the motor is brought to a standstill. In some applications this is sufficient, but in many applications these solutions are impractical and unreliable. The following examples are helpful to illustrate the detect rotor movement operation and closed loop control, which can account for and control motor operation regardless of pre-existing rotor movement at motor startup.

FIGS. 13-16 illustrates several graphs associated with motor startup for four different starting situations of an IPMSM in accordance with an embodiment of the present disclosure. For all of the graphs, time is illustrated in seconds (s) on the x-axis. For FIGS. 13A, 14A, 15A, and 16A, motor speed is illustrated on the y-axis in revolutions per minute (RPM) and the graph indicates where the flux observer speed estimate is utilized for motor control (i.e. observermode=1) and where the HFI speed estimate is utilized for motor control (i.e. observermode=0). For FIGS. 13B, 14B, 15B, and 16B, the magnitude of one of the three phase stator currents, $i_a$, is illustrated on the y-axis in amps (A). For FIGS. 13C, 14C, 15C, and 16C, the sensorless flag and enableHF flags, along with the statedrive flag are illustrated along the y-axis. The enableHF flag is binary, either being on or off. If active, the sensorless flag can be 1-5 as shown in FIG. 11 (0 if inactive). The statedrive flag can drive initial operation before starting control is initiated. At statedrive=1 the preparation for detect rotor movement activates. At statedrive=5 the programmed detect rotor movement operation is executed. At statedrive=9 the polarity detection operation is executed. And, at statedrive=0 the initial operation sequence is over, either the motor is idle or the handoff to starting motor control is complete via the sensorless flag.

Referring specifically to FIGS. 13A-C, this example shows a DFC closed loop starting process at an initial speed of 0 Rpm with 120-degree initial position angle. FIG. 13A shows reference, observed, and actual speed 173; FIG. 13B shows the Phase-A current waveform and FIG. 13C shows the flag states changing as motor control is executed in real time.

When starting, the movement detection 278 can be activated at first to detect the rotor initial speed. Since the speed detected is below the polarity threshold speed $\omega_1$, the HFI 274 is enabled to estimate the rotor position angle. Due to the low or zero speed, the polarity detection is carried out 275. During the polarity detection period 279, the HFI is disabled. During the polarity detection, the response to two current two pulses 275 are monitored. In the current embodiment, the second negative pulse of the amplitudes is larger than the first positive one, indicating that the position angle has to add 180 degree as an action based on the outcome of the polarity detection. The actual initial position angle is 120 degrees. The SensorlessFlag=3 can be seen in FIG. 13C.

After the polarity detection, since the rotor position angle is estimated, the movement detection is over, meanwhile the DHFI is enabled again 280. The dqController of DFC closed loop control steps in, ObserverMode=0, as depicted in area 271 of FIG. 13A. The rotor speed ramps up and quickly follows up to the reference speed by using the estimated speed based on the DHFI. The control keeps this ObserverMode=0 state until at speed threshold $\omega_h$, where the controller changes to the ObserverMode=1 state 272, SensorlessFlag=4 281 with the DHFI remaining enabled. In FIGS. 13B and 13C, it can be seen that the DHFI waveform adds on the Phase-A fundamental frequency current 276 until DHFI is disabled 277 at the speed $\omega_2$. It should be noted that the high frequency portion of the signal depicted in FIG. 13B (as well as 14B and 15B) of the $i_s$ stator response current is shown in a representative fashion with two lines while the enabled HFI 280 flag is on.

Specifically, when the speed reaches $\omega_2$, the DHFI is disabled and the controller sets the ObserverMode=1 state, SensorlessFlag=5, the system switches to using the flux observer to estimate position and speed for the closed loop direct flux control, driving the rotor ramp up until the starting process completes and the motor reaches its destination normal operational speed.

FIGS. 14A-C show a starting process at an initial speed of -5 Rpm. After the movement detection 183, polarity detection is performed due to the initial low speed that is detected. During the polarity detection 181, the first positive peak amplitude is larger than the second negative one, indicating that the position angle aligns with the positive pole direction based on the polarity detection outcome. The position angle is correct in comparison with the detection result of FIG. 14

FIGS. 15A-C show a closed loop control starting process at an initial actual speed of -200 Rpm. This actual motor speed value is unknown to the motor controller, but helpful for understanding operation of the motor controller and the detect rotor movement operation.

The movement detection 193 indicates that the speed is outside the polarity detection window $(-\omega_1, \omega_1)$, but within the active DHFI window $(-\omega_2, \omega_2)$. Therefore, DHFI is activated, which is evidenced by the enableHF flag 196 being set to 1. The ObserverMode 191 is set to 0 and sensorlessFlag 195 is set to 3 because the −200 Rpm initial estimated motor speed falls within the DHFI Closed-loop DFC window $(-\omega_h, \omega_h)$. The DHFI DFC threshold $|\omega_h|$ being 200 Rpm in this embodiment. Once the detect rotor movement operation is complete, in this case due to a pre-programmed time of 0.8 seconds expiring, since ObserverMode=0 and SensorlessFlag=3, estimated speed is obtained from the HF angle observer 129 via the flux observer 67 and fed to DFC 62 for DHFI-DFC closed loop control 194 until the estimated motor speed exceeds the 200 Rpm initial flux observer threshold $|\omega_h|$. That is, under the DHFI-DFC closed loop control 194, the motor speed ramps up and passes through the zero speed from negative to positive rotating direction 192. Then, upon passing the initial flux observer threshold, the SensorlessFlag 197 changes its state to 4 and observermode 198 changes to 1 activating flux observer-DFC with DHFI. In this embodiment, because DHFI has been active, the flux observer speed estimate has been automatically prepared in parallel to the HFI-based speed estimate. Upon passing the 200 Rpm threshold, the flux observer is deemed a more reliable speed estimate and provided to the control system instead of the HFI-based speed estimate. However, the high frequency injection and decoupling, according to DHFI, continues until the speed estimate reaches or exceeds the stable flux observer threshold $|\omega_2|$.

Returning to the detect rotor movement operation 193 for a more in-depth discussion, the motor controller assumes the motor speed is zero by setting the reference rotor position $v^*$, reference d rotor current $i_d^*$, and reference q rotor current $i_q^*$ to zero. This is represented in FIG. 15A by the reference speed $\omega_{ref}$ being 0 during the detect rotor movement operation 193. In universal dqController embodiments, the reference position and currents being zero can be a trigger condition for the universal dqController to reconfigure as current-current controllers that output back-EMF information or voltages and enable appropriate DFC 62 components without enabling the control functionality of the DFC 62. That is, in this configuration, the voltage vector in the stationary frame $\bar{v}^*_{\alpha\beta}$ represents the back-EMF information associated with rotation of the motor. Further, in this configuration, the flux observer 67 can detect the rotor speed during the movement detection operation based on the back-EMF information provided to it. It can take a bit of time (e.g., between about 50 to 500 milliseconds, but typically less than 100 milliseconds) for the detect rotor movement operation to initiate and the flux observer to accurately estimate the motor speed. FIG. 15A shows how the flux observer can output an estimated speed $\omega_{m,obs}$ that is stable based on the provided back-EMF information after a small amount of time. Due to the underlying configuration and operation of the flux observer, it will typically initially overshoot the correct rotor speed value and then settle to match the actual motor speed $\omega_m$.

Toward the end of the programmed detect rotor movement operation 193, where the observed motor speed is steady, the motor controller can be programmed to transition to motor startup control based on the observed speed.

FIGS. 16A-C show a closed loop control starting process at an initial speed of 300 Rpm. The movement detection operation 203 provides an initial estimated motor speed of 300 Rpm and therefore does not trigger DHFI or polarity detection. The SensorlessFlag is set to 5 and the DFC closed loop control drives the rotor speed ramp-up 201 until the operational destination speed.

In each of the four examples discussed above and depicted in FIGS. 13-16, the initial estimated motor speed after the detect rotor movement operation 178, 182, 193, 203 is 0 Rpm, −5 Rpm, −200 Rpm, and 300 Rpm, respectively. That value can be used in connection with a look-up table or other conditional programming to initially configure the motor controller to one of the starting motor control states 141-147 shown in FIG. 11. The starting motor control states control motor operation during a motor startup period 153 as the motor speed 152 changes over time, typically increasing, toward normal operating speeds. The starting motor control states can be defined by different motor speed thresholds. For example, in FIGS. 13-16, $|\omega_1| \omega=10$, $|\omega_h|=200$, and $|\omega_2|=250$. Therefore, as explained above, for FIG. 15A where the observed speed by the detect rotor movement operation is about −200 RPM, the motor starting control would transition to DHFI closed-loop DFC, due to how the edge cases are handled in this embodiment.

As shown in FIGS. 13A, 14A, 15A, and 16A, the reference rotor speed $\omega_{ref}$ is set to zero by the motor controller as part of the programmed detect rotor movement operation. Then, during startup, the reference motor speed $\omega^*$ is the ramp up rate during motor startup control, as shown in FIG. 7 being input into the speed controller 61. In FIGS. 13A, 14A, and 15A, the rotor actual speed $\omega_m$ is zero, −5 Rpm, and −200 Rpm, respectively so the detect rotor speed operation enables HFI instead of passing back-EMF voltage information to the stator flux observer. In the case of FIGS. 13B-C and 14B-C, since the motor speed estimate is within the polarity detection threshold of 10 Rpm, polarity detection 179, 183 is activated. For FIG. 16A, the rotor actual speed $\omega_m$ is outside the DHFI range, so the detect rotor speed operation passes the back-EMF voltage information to the stator flux observer, which in turn estimates the rotor speed $\omega_{m,obs}$. In each case, as starting motor control begins after the detect rotor movement operation, the motor controller has a reliable and robust speed estimate. Either because the detect rotor movement operation passed back-EMF information to the stator flux observer due to detecting sufficient rotor movement, or because the detect rotor movement operation did not detect sufficient rotor movement and activated HFI so that an HFI-based speed estimate could be obtained. In each case, the detected observer speed $\omega_{m,obs}$ (which can include any speed estimation method since the speed estimates are ultimately routed through the flux observer) reaches a stable output in a short time frame, less than 500 milliseconds and in the depicted situations less than 100 milliseconds. The control system can utilize the stable speed estimate to execute an appropriate motor control strategy, for example by identifying the speed zone of the observer speed and setting the appropriate SensorlessFlag to trigger the appropriate control mode. This configuration or mode selection can be executed at the tail end of the detect rotor movement operation as depicted in FIGS. 13-16, illustrated by the change in Sensorless flag prior to the conclusion of the detect rotor movement operation, or in a separate operation after the detect rotor movement operation is complete.

Directional terms, such as "vertical," "horizontal," "top," "bottom," "upper," "lower," "inner," "inwardly," "outer"

and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A sensorless interior permanent magnet synchronous motor comprising:
    a motor housing;
    a stator mounted in the motor housing and defining a cylindrical space, the stator having a three-phase stator winding configuration;
    a rotor including a plurality of interior permanent magnets distributed circumferentially such that the rotor exhibits magnetic saliency, the rotor being rotatable inside the cylindrical space via excitation of the three-phase stator winding configuration of the stator;
    a motor control system mounted in the motor housing including:
        a power supply;
        a sensing circuit configured to sense one or more electrical characteristics of the stator;
        a controller configured to provide closed loop control during motor startup, the controller being configured to:
            detect rotor movement during a starting moment to obtain a starting moment motor speed estimate;
            select from among a plurality of different motor speed estimation methods, one of the plurality of different motor speed estimation methods as an initial startup motor speed estimation method based on the starting moment motor speed estimate;
            estimate motor speed according to the selected initial startup motor speed estimation method; and
            generate driving commands during motor startup using closed loop control based on feedback provided to the controller, the feedback including information based on the one or more electrical characteristics of the stator and a motor speed estimate obtained according to the selected initial startup motor speed estimation; and
        a driving circuit for generating excitation signals for the three-phase stator winding configuration of the stator according to the driving commands during motor startup.

2. The sensorless interior permanent magnet synchronous motor of claim 1 wherein the controller is configured to obtain the starting moment motor speed estimate by providing a voltage error vector to the flux observer, wherein the voltage vector is obtained as a function of stator currents during the starting moment.

3. The sensorless interior permanent magnet synchronous motor of claim 1 wherein the controller is configured to obtain the starting moment motor speed estimate as a function of back-EMF information during the starting moment.

4. The sensorless interior permanent magnet synchronous motor of claim 3 wherein the controller includes a universal dqController selectively configurable between a first configuration where the universal dqController is programmed to obtain the back-EMF information and obtain the starting moment motor speed estimate based on the back-EMF information, and a second configuration where the universal dqController is programmed to generate driving commands according to a direct flux control method.

5. The sensorless interior permanent magnet synchronous motor of claim 4 wherein the first configuration of the universal dqController includes a dController configured for current control and a qController configured for current control, and wherein the second configuration of the universal dqController includes a dController configured for flux control and a qController configured for current control.

6. The sensorless interior permanent magnet synchronous motor of claim 1 wherein the plurality of different motor speed estimation methods includes a high frequency injection ("HFI") motor speed estimation method and a flux observer motor speed estimation method, wherein the controller selects the HFI motor speed estimation method as the initial startup motor speed estimation method in response to the starting moment speed estimate being below a threshold speed and wherein the controller selects the flux observer motor speed estimation method in response to the starting moment speed estimate being above the threshold speed.

7. The sensorless interior permanent magnet synchronous motor of claim 1 wherein the plurality of different motor speed estimation methods includes a dynamic high frequency injection ("DHFI") motor speed estimation method, wherein the controller selects the DHFI motor speed estimation method as the initial startup motor speed estimation method in response to the starting moment speed estimation being below a threshold speed, and wherein the controller is configured to estimate motor speed according to the DHFI motor speed estimation method by configuring the controller to inject a high frequency signal into the three-phase stator winding configuration in addition to the excitation signals generated by the driving circuit, sense a response in the three-phase stator winding configuration to the combined high frequency signal and excitation signals generated by the driving circuit, decouple the response to the high frequency signal injection from the sensed response, estimate the motor speed based on the decoupled response to the high frequency signal injection, decouple the response to the excitation signals from the sensed response, and provide the decoupled response to the excitation signals as feedback to the controller.

8. The sensorless interior permanent magnet synchronous motor of claim 7 wherein the controller is configured to decouple the response to the high frequency signal injection from the sensed response and decouple the response to the excitation signals from the sensed response by two identical moving average filters, wherein the output of the filters is the high frequency q-axis current, wherein the controller is configured to estimate the motor speed based on the q-axis current, wherein the controller is configured to remove the q-axis current from the sensed response to decouple the response to the excitation signals from the sensed response and provide the decoupled response to the excitation signals as input to a stator flux observer.

9. The sensorless interior permanent magnet synchronous motor of claim 7 wherein the controller is configured to decouple the response to the high frequency signal injection from the sensed response and decouple the response to the excitation signals from the sensed response by at least one of a band-pass and a band-stop filter.

10. The sensorless interior permanent magnet synchronous motor of claim 1 wherein the controller is configured to obtain a first motor speed estimate based on the one or more electrical characteristics of the stator and a magnetic saliency of the rotor, and a second, different, motor speed estimate based on the one or more electrical characteristics of the stator and a mathematical model of the motor for estimating magnetic stator flux.

11. The sensorless interior permanent magnet synchronous motor of claim 10, wherein the controller is configured to inject a high frequency signal into the three-phase stator winding configuration in addition to the excitation signals generated by the driving circuit, sense a response in the three-phase stator winding configuration to the combined high frequency signal and excitation signals generated by the driving circuit, decouple the high frequency signal and excitation signals generated by the driving circuit in the response, obtain the first motor speed estimate based on the decoupled high frequency signal response, and obtain the second motor speed estimate based on the decoupled excitation signals response.

12. The sensorless interior permanent magnet synchronous motor of claim 1 wherein the starting moment motor speed estimate includes information sufficient to derive rotor speed and rotor position, and wherein speed estimates obtained from the selected motor speed estimation method include includes information sufficient to derive rotor speed and rotor position.

13. The sensorless interior permanent magnet synchronous motor of claim 1 wherein the controller is programmed to generate the driving commands without open loop control.

14. The sensorless interior permanent magnet synchronous motor of claim 1 wherein the controller is programmed to generate the driving commands during startup based on a control flag set based on estimated motor speed.

15. The sensorless interior permanent magnet synchronous motor of claim 1 wherein the controller is programmed to generate driving commands during startup based on a plurality of control flags including a movement detection flag, a high frequency injection flag, a polarity detection flag, and an observer mode flag.

16. A startup motor control method for a sensorless interior permanent magnet synchronous motor having a motor control system, a rotor, and a stator, the method comprising:
sensing one or more electrical characteristics of the stator;
detecting rotor movement during a starting moment to obtain a starting moment motor speed estimate; and
selecting from among a plurality of different motor speed estimation methods, one of the pluralities of different motor speed estimation methods as an initial startup motor speed estimation method based on the starting moment motor speed estimate;
estimating motor speed according to the selected initial startup motor speed estimation method;
generating driving commands during motor startup based on feedback provided to the motor control system, the feedback including information based on the one or more electrical characteristics of the stator and a motor speed estimate obtained according to the selected initial startup motor speed estimation;
generating excitation signals for the stator according to the driving commands generated during motor startup.

17. The startup motor control method of claim 16 wherein obtaining the starting moment motor speed estimate includes providing a voltage vector to a flux observer, wherein the voltage vector is obtained as a function of stator currents during the starting moment.

18. The startup motor control method of claim 16 wherein the obtaining the starting moment motor speed estimate includes detecting back-EMF information during the starting moment and obtaining the starting moment motor speed estimate based on the back-EMF information.

19. The startup motor control method of claim 18 including selectively configuring a universal dqController between a first configuration where the universal dqController is programmed to obtain back-EMF information associated with the rotor and a second configuration where the universal dqController is programmed to generate the driving commands according to a direct flux control method during motor startup.

20. The startup motor control method of claim 18 wherein selectively configuring the universal dqController into the first configuration includes configuring a dcontrol for current control and a qcontroller for current control, and wherein selectively configuring the universal dqController into the second configuration includes configuring a dController for flux control and a qController for current control.

21. The startup motor control method of claim 16 including selecting a high frequency injection ("HFI") motor speed estimation method as the initial startup motor speed estimation method in response to the starting moment speed estimate being below a threshold and selecting a flux observer motor speed estimation method in response to the starting moment speed estimate being above a threshold.

22. The startup motor control method of claim 16 including selecting a dynamic high frequency injection ("DHFI") motor speed estimation method in response to the starting moment speed estimation being below a threshold, and estimating motor speed according to DHFI by injecting, into the stator, a high frequency signal and the excitation signals generated by the driving circuit, sensing a response in the stator to the combined high frequency signal and excitation signals, decoupling at least one of the high frequency signal and excitation signal generated by the driving circuit from the response, and estimating motor speed based on the at least one decoupled signal.

23. The startup motor control method of claim 22 wherein the decoupling includes decoupling the high frequency signal injection from the sensed response and decoupling the excitation signals from the sensed response by filtering the response in the stator to the combined high frequency signal and excitation signals.

24. The startup motor control method of claim 16 including obtaining a first motor speed estimate based on the one or more electrical characteristics of the stator and a magnetic saliency of the rotor, and a second, different, motor speed estimate based on the one or more electrical characteristics of the stator and a mathematical model of the motor.

25. The startup motor control method of claim 16 wherein the starting moment motor speed estimate includes information sufficient to derive rotor speed and rotor position, and wherein speed estimates obtained from the selected motor speed estimation method include includes information sufficient to derive rotor speed and rotor position.

26. The startup motor control method of claim 16 including generating the driving commands during startup without open loop control.

27. The sensorless interior permanent magnet synchronous motor of claim 1 wherein the plurality of different motor speed estimation methods includes a dynamic high frequency injection ("DHFI") motor speed estimation method, wherein the controller is configured to estimate motor speed according to the DHFI motor speed estimation method by configuring the controller to inject a high frequency signal into the three-phase stator winding configuration in addition to the excitation signals generated by the driving circuit, sense a response in the three-phase stator winding configuration to the combined high frequency signal and excitation signals generated by the driving circuit, decouple the response to the high frequency signal injection from the sensed response, estimate the motor speed based on the decoupled response to the high frequency signal injection, decouple the response to the excitation signals from the sensed response, and provide the decoupled response to the excitation signals as feedback to the controller.

28. The sensorless interior permanent magnet synchronous motor of claim 27 wherein the controller is configured to maintain a speed based on the decoupled signal for at least a predetermined time or a trigger is received.

29. The startup motor control method of claim 16 including estimating motor speed according to a dynamic high frequency injection ("DHFI") motor speed estimation method by injecting, into the stator, a high frequency signal and the excitation signals generated by the driving circuit, sensing a response in the stator to the combined high frequency signal and excitation signals, decoupling at least one of the response to the high frequency signal and the response to the excitation signals from the stator response and executing closed loop direct flux control based on the decoupled signal.

30. The startup motor control method of claim 29 including maintaining a speed within a predetermined range via the closed loop direct flux control based on the decoupled signal for at least a predetermined time or until receiving a trigger.

* * * * *